US012744993B1

(12) United States Patent
Cheema et al.

(10) Patent No.: US 12,744,993 B1
(45) Date of Patent: Sep. 22, 2026

(54) AUTOMATED SYSTEM HAVING VERTICAL AND HORIZONTAL STACKING OF PHOTO STUDIOS FOR EFFICIENT IMAGE CAPTURE

(71) Applicant: The RealReal, Inc., San Francisco, CA (US)

(72) Inventors: Hasan Cheema, San Francisco, CA (US); John Paul Dombrowski, Campbell, CA (US)

(73) Assignee: The RealReal, Inc., San Francisco, CA (US)

( * ) Notice: Subject to any disclaimer, the term of this patent is extended or adjusted under 35 U.S.C. 154(b) by 282 days.

(21) Appl. No.: 18/478,877

(22) Filed: Sep. 29, 2023

(51) Int. Cl.
*H04N 23/60* (2023.01)
*H04N 23/71* (2023.01)
*H04N 23/74* (2023.01)
*H04N 23/90* (2023.01)

(52) U.S. Cl.
CPC ............ *H04N 23/64* (2023.01); *H04N 23/71* (2023.01); *H04N 23/74* (2023.01); *H04N 23/90* (2023.01)

(58) Field of Classification Search
CPC ........ H04N 23/64; H04N 23/71; H04N 23/74; H04N 23/90; H04N 7/183; H04N 7/181; H04N 21/2665; H04N 21/21
See application file for complete search history.

(56) References Cited

U.S. PATENT DOCUMENTS

| | | | | |
|---|---|---|---|---|
| 9,661,275 | B2 * | 5/2017 | Gordon | H04N 21/21 |
| 10,129,579 | B2 * | 11/2018 | Meredith | H04N 21/2665 |
| 10,699,323 | B1 * | 6/2020 | Tang | G06T 19/006 |
| 2012/0169882 | A1 * | 7/2012 | Millar | G08B 13/19608 348/E7.086 |
| 2012/0230577 | A1 * | 9/2012 | Calman | G06Q 20/0425 382/138 |
| 2013/0162781 | A1 * | 6/2013 | Hubner | H04N 13/243 348/47 |
| 2014/0198215 | A1 * | 7/2014 | Schumm | H04N 7/181 348/159 |
| 2020/0163548 | A1 * | 5/2020 | Fukuma | A61B 3/145 |
| 2022/0245900 | A1 * | 8/2022 | Tan | G06T 7/55 |
| 2023/0056882 | A1 * | 2/2023 | Iida | H04N 7/183 |

* cited by examiner

*Primary Examiner* — Hung H Lam
(74) *Attorney, Agent, or Firm* — Adibi IP Group, PC; Amir V. Adibi; Andrew C. Palmer

(57) ABSTRACT

An automated system having vertical and horizontal stacking of photo studios is provided. In one embodiment, the system includes a plurality of imaging studios in close proximity to each other. The plurality of imaging studios are configured to capture images of a plurality of items, respectively. The system further includes a camera device executing an application configured to capture at least one image of a selected item in a selected imaging studio. The application performs operations of guiding a user to display a view of the item within an imaging studio, capturing an image of the item in response to user input, and repeating the operations of guiding and capturing until a selected number of views of the item have been captured.

20 Claims, 19 Drawing Sheets

SYSTEM FOR STACKED STUDIO HORIZONTAL AND VERTICAL DENSIFICATION AND AUTOMATION

SYSTEM FOR STACKED STUDIO HORIZONTAL AND VERTICAL DENSIFICATION AND AUTOMATION

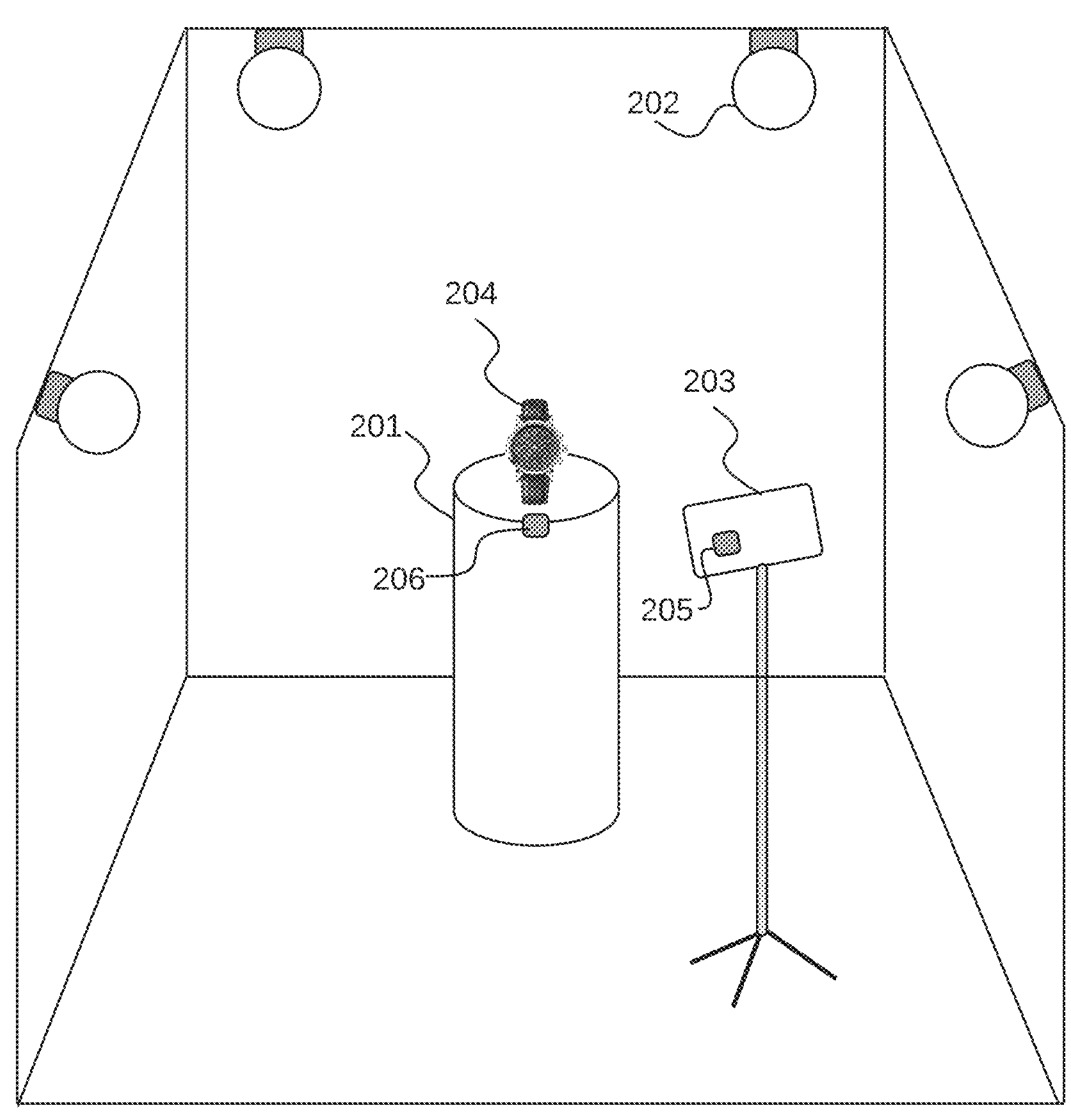
SMALL STUDIO CONFIGURATION
FIG. 2

SMALL STUDIO CAMERA DEVICE

GUIDING A USER TO OPERATE A SMALL STUDIO IMAGE CAPTURE SYSTEM

FORMING A STACKED STUDIO SYSTEM

CAMERA DEVICE INTERFACE TO IMAGE SERVER

CAMERA DEVICE SELECT ITEM USER INTERFACE

CAMERA DEVICE SELECT VIEW USER INTERFACE

CAMERA DEVICE ADJUST LIGHTING USER INTERFACE

CAMERA DEVICE IMAGE CAPTURE
USER INTERFACE

CAMERA DEVICE TRANSMIT IMAGES
USER INTERFACE

STACKED STUDIOS WITH MOVABLE CAMERA DEVICE AND CENTRAL CONTROLLER

CENTRAL CONTROL OF STACKED STUDIO IMAGE CAPTURE SYSTEM

CAMERA DEVICE
(HEADSET EMBODIMENT)

CAMERA DEVICE
(HEADSET EMBODIMENT)

USER INTERFACE OF CAMERA DEVICE AS VIEWED BY USER THROUGH HEADSET

USER INTERFACE OF CAMERA DEVICE AS VIEWED BY USER THROUGH HEADSET

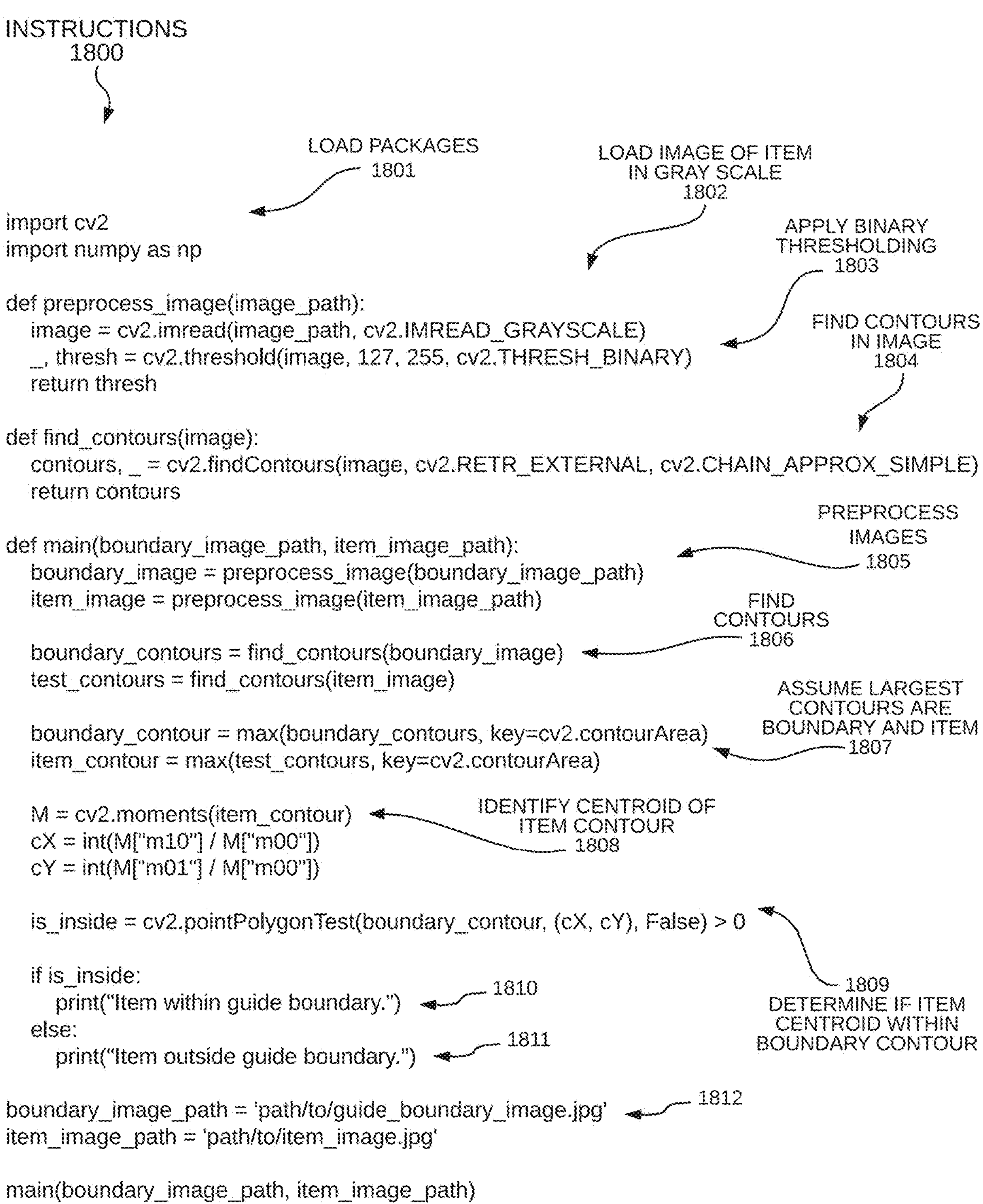

```
import cv2
import numpy as np

def preprocess_image(image_path):
    image = cv2.imread(image_path, cv2.IMREAD_GRAYSCALE)
    _, thresh = cv2.threshold(image, 127, 255, cv2.THRESH_BINARY)
    return thresh

def find_contours(image):
    contours, _ = cv2.findContours(image, cv2.RETR_EXTERNAL, cv2.CHAIN_APPROX_SIMPLE)
    return contours

def main(boundary_image_path, item_image_path):
    boundary_image = preprocess_image(boundary_image_path)
    item_image = preprocess_image(item_image_path)

    boundary_contours = find_contours(boundary_image)
    test_contours = find_contours(item_image)

    boundary_contour = max(boundary_contours, key=cv2.contourArea)
    item_contour = max(test_contours, key=cv2.contourArea)

    M = cv2.moments(item_contour)
    cX = int(M["m10"] / M["m00"])
    cY = int(M["m01"] / M["m00"])

    is_inside = cv2.pointPolygonTest(boundary_contour, (cX, cY), False) > 0

    if is_inside:
        print("Item within guide boundary.")
    else:
        print("Item outside guide boundary.")

boundary_image_path = 'path/to/guide_boundary_image.jpg'
item_image_path = 'path/to/item_image.jpg'

main(boundary_image_path, item_image_path)
```

DETECTING ITEM ALIGNED WITHIN GUIDE BOUNDARY FOR IMAGE CAPTURE

FIG. 18

USING IMAGE CAPUTRE SYSTEM TO VALIDATE CONDITION OF RECEIVED ITEMS

AUTOMATED SYSTEM HAVING VERTICAL AND HORIZONTAL STACKING OF PHOTO STUDIOS FOR EFFICIENT IMAGE CAPTURE

TECHNICAL FIELD

The present invention relates generally to image processing systems, and more specifically, to a system with vertical and horizontal stacking of photo studios for efficient image capture.

BACKGROUND INFORMATION

Retailers need to capture images of items that are for sale for advertising purposes. The captured images should be of high quality, properly lighted, and provide one or more views of an item for sale. This results in significant expense since the cost of professional studios and skilled photographers must be taken into account.

SUMMARY

In various embodiments, an automated system having vertically and horizontally stacked photo studios is provided. Stacked small studios provide a way for small items to be presented in identical environments and photographed using smart devices, such as smartphones or cameras with adequate image resolution and pixel density without significant loss of quality. In one embodiment, a camera device is programmed to automate the photo capture process by presenting clear, easy to follow prompts that guide a camera operator to capture desired images of an item.

In one embodiment, a system is provided that includes a plurality of imaging studios in close proximity to each other. Each imaging studio is configured to display an item. The system also includes a camera device configured to capture at least one image of an item in an imaging studio. The camera device performs operations of: guiding a user to display a view of the item within an imaging studio, capturing an image of the item in response to user input, and repeating the operations of guiding and capturing until a selected number of views of the item have been captured.

In one embodiment, a method is provided that guides a user to operate a stacked studio image capture system. The method is performed by a mobile application operating on a tablet, mobile phone, or other mobile computing device having a processor, memory, and one or more image sensors. First, a user is prompted to enter a type of item for image capture. For example, a mobile application generates and presents a user interface on a display that prompts the user to enter the type of item to be photographed.

Next, a database is accessed to determine the "shots" or views to be captured for the selected item. For example, based on the user input about the type of item to be photographed, a processor accesses an item database to determine the number of views and other information that will be used to photograph the item.

Next, the user is requested to place the item in the studio and position the item to capture the first view. For example, the application generates and presents a user interface on a display that prompts the user to place the item in the studio to capture a particular view of the item.

Next, the lighting in the studio is adjusted to capture the view of the item. For example, the application generates and presents a user interface on a display that prompts the operator to adjust the lighting in the studio. In one embodiment, the lighting is adjusted automatically by the application based on detected lighting conditions. In another embodiment, the lighting is adjusted manually by the user.

Next, a determination is made as to whether the lighting has been properly adjusted. For example, the processor receives lighting information from the light sensor and uses this information to determine if the lighting is properly adjusted. The application guides the user in adjusting the lighting conditions until sufficient lighting conditions are detected.

Next, an image of the item is captured. For example, the application generates and presents a user interface on a display that prompts the user to preview and capture an image of the item having the current view and lighting conditions.

Next, a determination is made as to whether the image meets selected quality standards. For example, the processor determines if the captured image meets the selected quality standards. The application guides the user in obtaining images until adequate images are obtained.

Next, a determination is made as to whether all views of the item have been captured. The processor makes this determination at least in part from information obtained from the item database. For example, if information from the item database indicates that three views of the item are to be captured, the processor determines if all three views have been captured. The application guides the user in obtaining all views until all required views have been obtained.

After all views have been captured, the images of the item are transmitted to an image server. For example, the processor uses an Application Programming Interface (API) to transmit images of the item over a network channel to an image server. The novel method performs operations for guiding a user to operate a stacked studio image capture system.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 2 is a diagram of a detailed embodiment of a small studio configuration for use with the system shown in FIG. 1.

FIG. 18 is a diagram of instructions for detecting when an item is aligned within a guide boundary for image capture.

DETAILED DESCRIPTION

Reference will now be made in detail to some embodiments of the invention, examples of which are illustrated in the accompanying drawings.

Figure 1:
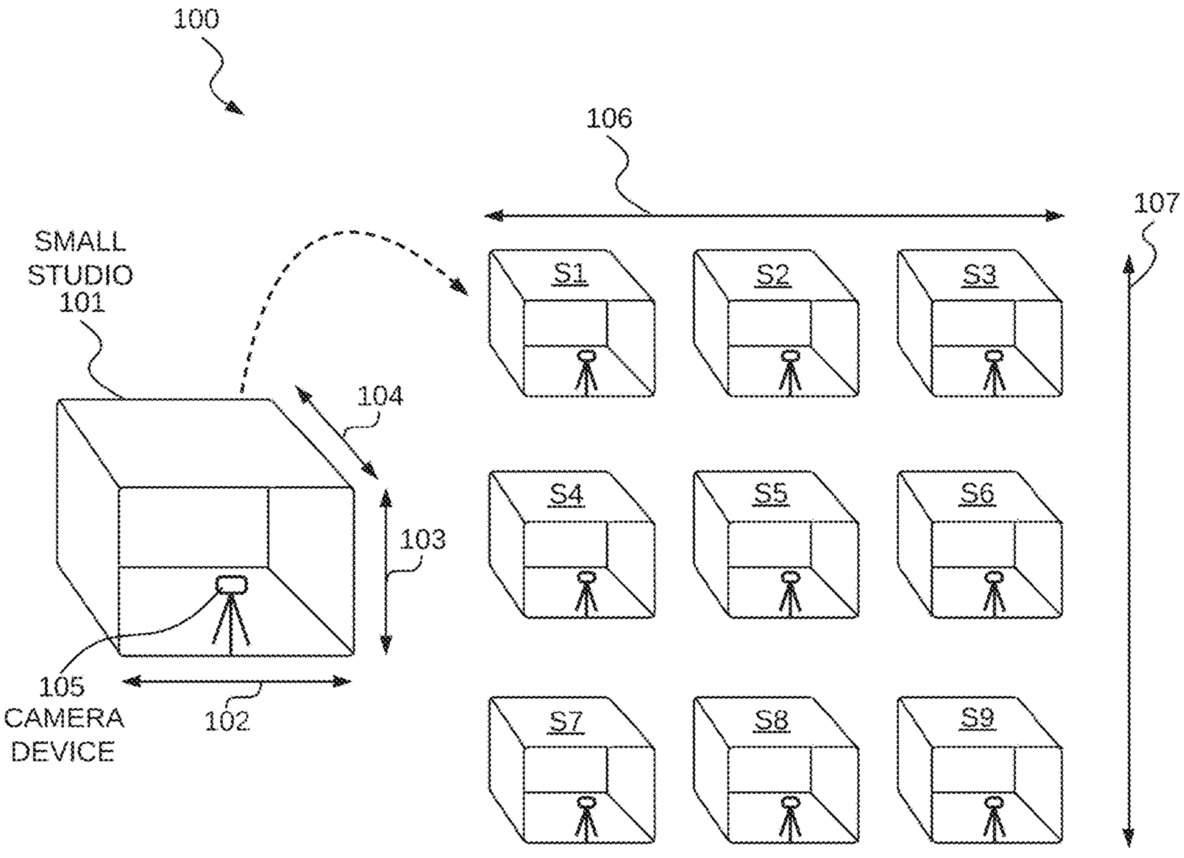
FIG. 1 is a diagram of a system for stacked studio horizontal and vertical densification and automation constructed in accordance with one embodiment.

FIG. 1 is a diagram of a system 100 providing horizontal and vertical studio stacking (e.g., densification) and automation that is constructed in accordance with one embodiment. The stacked studios provide a way for small items to be presented in identical environments and efficiently photographed using a smart device, such as smartphones or cameras with adequate image resolution, illumination, color correction, and pixel density without significant loss of quality.

As illustrated in FIG. 1, a small studio 101 is replicated and stacked in a horizontal 106 and vertical 107 configuration. Each small studio has a width 102, height 103, and a depth 104 that is large enough to provide a studio setting to capture images of small items. In one embodiment, each small studio is approximately a 1 meter cube. A camera device 105 is provided for each studio, or in another embodiment, only one camera device is provided that is moveable to capture images in multiple studios. Controllable lighting devices are also provided for each studio.

In one embodiment, a photo studio application is provided that executes on the camera device 106 to guide an operator to load an item into a small studio, rotate the item for the next view to be captured, and detect and alert the operator to any errors, such as the lighting being too bright or dark or glare obstructing the image. The application ensures that the correct number of images are captured for each item and that conditions are appropriately controlled, so that a less skilled operator can be used to capture item images that meet selected image standards. Thus, the application operates to reduce the need to re-take photos that are outside the desired specifications, thereby saving time while allowing a less-skilled operator to efficiently capture high quality images of small items.

FIG. 2 is a diagram of a detailed embodiment of a small studio 200 for use with the system shown in FIG. 1. For example, the studio 200 is suitable for use as the studio 101 that is horizontally and vertically stacked as shown in FIG. 1. The small studio 200 comprises a stand or podium 201 that holds or supports an item 204 to be photographed. Configurable lights 202 are placed at selected locations around the studio 200 and a light detector 206 is positioned to capture lighting information. A moveable camera device 203 is positioned within the studio 200 to capture various views of the item 204.

During operation, the camera device 203 executes an application 205 that guides an operator through a sequence of operations to capture images of the item 204. In one embodiment, the application 205 automatically detects the lighting conditions within the studio 200 using the detector 206 and configures the lights 202 for proper illumination of the item 204. The application 205 also notifies the operator to reposition the item so that a sequence of item views can be captured.

Figure 3:
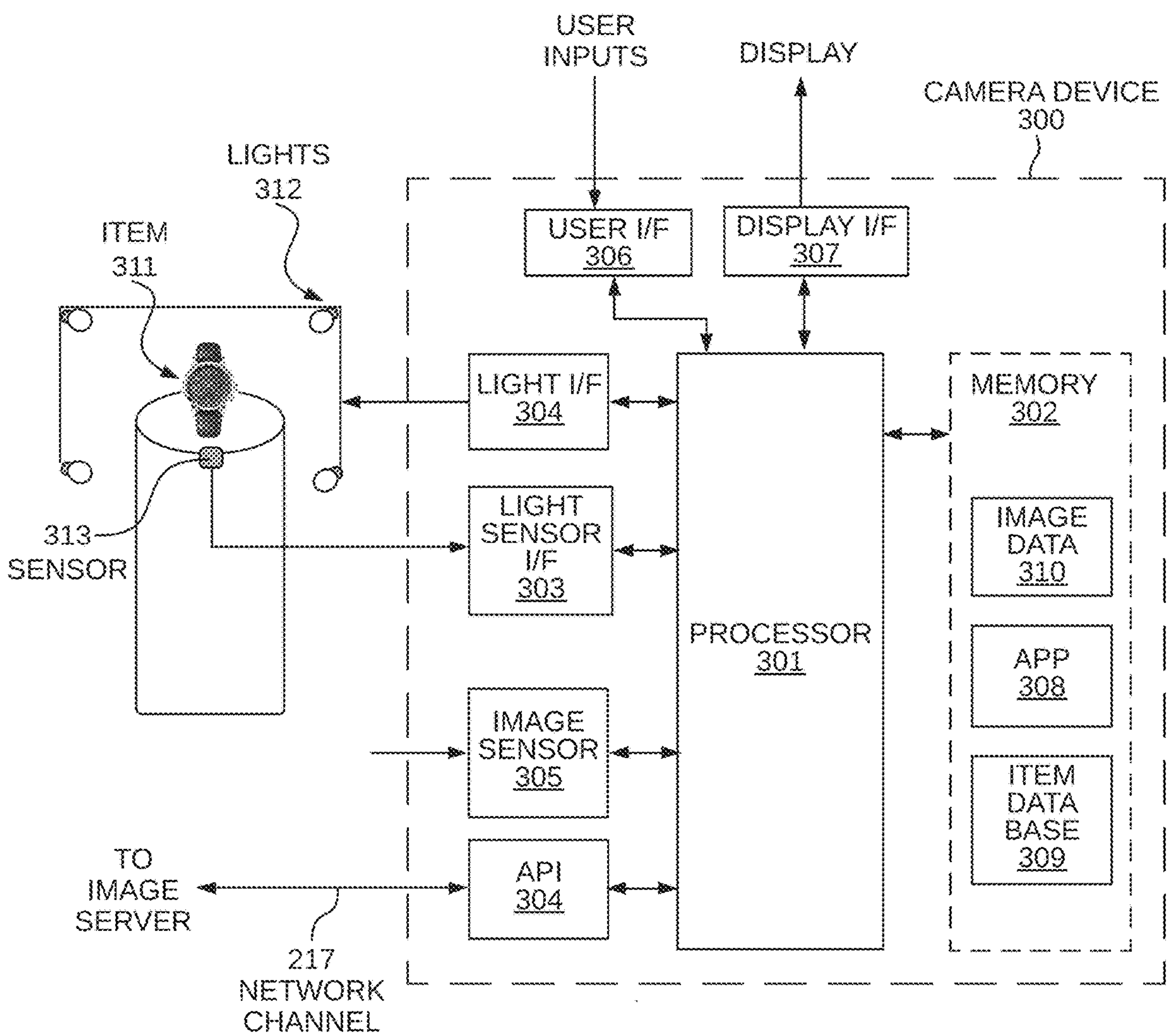
FIG. 3 is a diagram of a small studio camera device.

FIG. 3 is a diagram of a camera device 300 for use in a small studio. For example, the camera device 300 is suitable for use as the camera device 203 shown in FIG. 2. The functions of the camera device 203 described below are configured to allow the camera device to capture item images for items in any of the stack studios shown in FIG. 2.

In one embodiment, the camera device 300 comprises a processor 301, memory 302, light interface 304, image sensor 305, light sensor interface 303, application program interface 304, user interface 306, and display interface 307. The memory 302 is configured to store an application 308, item database 309, and image data 310.

During operation, the processor 301 executes the application 308 to perform a variety of functions to capture images of the item 311. In one embodiment, the processor 301 controls the display interface 307 to display or present various interactive and dynamically generated user interfaces to the operator with which to guide the operator in the process of capturing images. In response to various displays, the operator provides user inputs to the user interface 306, which are then passed to the processor 301. For example, the user inputs comprise item selection, view selection, lighting adjustments, and any other inputs necessary for capturing images of the item 311.

In one embodiment, the processor 311 controls the studio lights 312 using the lighting interface 304. The lights may be dimmed or brightened or their color temperature may be changed under the control of the processor 301. The light sensor 313 provides information to the processor 301 through the light sensor interface 303 regarding the characteristics of the light 312. For example, the light sensor 313 may sense that the light illuminating the item 311 is too bright or too dim or that the color temperature of the light should be adjusted. Any aspect of the lighting is controllable by the processor 301 using the light interface 304.

In one embodiment, the image sensor 305, captures an image of the item in response to user input. The processor 301 analyzes the image to confirm that the image quality meets a selected standard. For example, the image quality should be of a selected resolution and should show features of the item clearly without glare or distortion. Once a captured image meets all the quality requirements, the processor 301 then stores the captured image as image data 310 in the memory 302.

In one embodiment, the processor 301 accesses the item database 309 to obtain a variety of information about items to be photographed. For example, for each item there may be information on the type of lighting to be used, the number and types of views to be captured, and the aspect ratio of the views that are captured. For example, the user inputs an item type through a screen interface (or scans a code or tag of the item) into the processor 301 through the user interface 306, and the processor 301 uses the input data to obtain information about the item from the item database 309. The obtained information is used to capture high quality images of the item.

Once all the images of the item have been captured, the processor 301 transmits the images through the API 304 over a network channel 207 to an image server. Thus, after the images are captured they are transmitted to an external entity.

Figure 4:
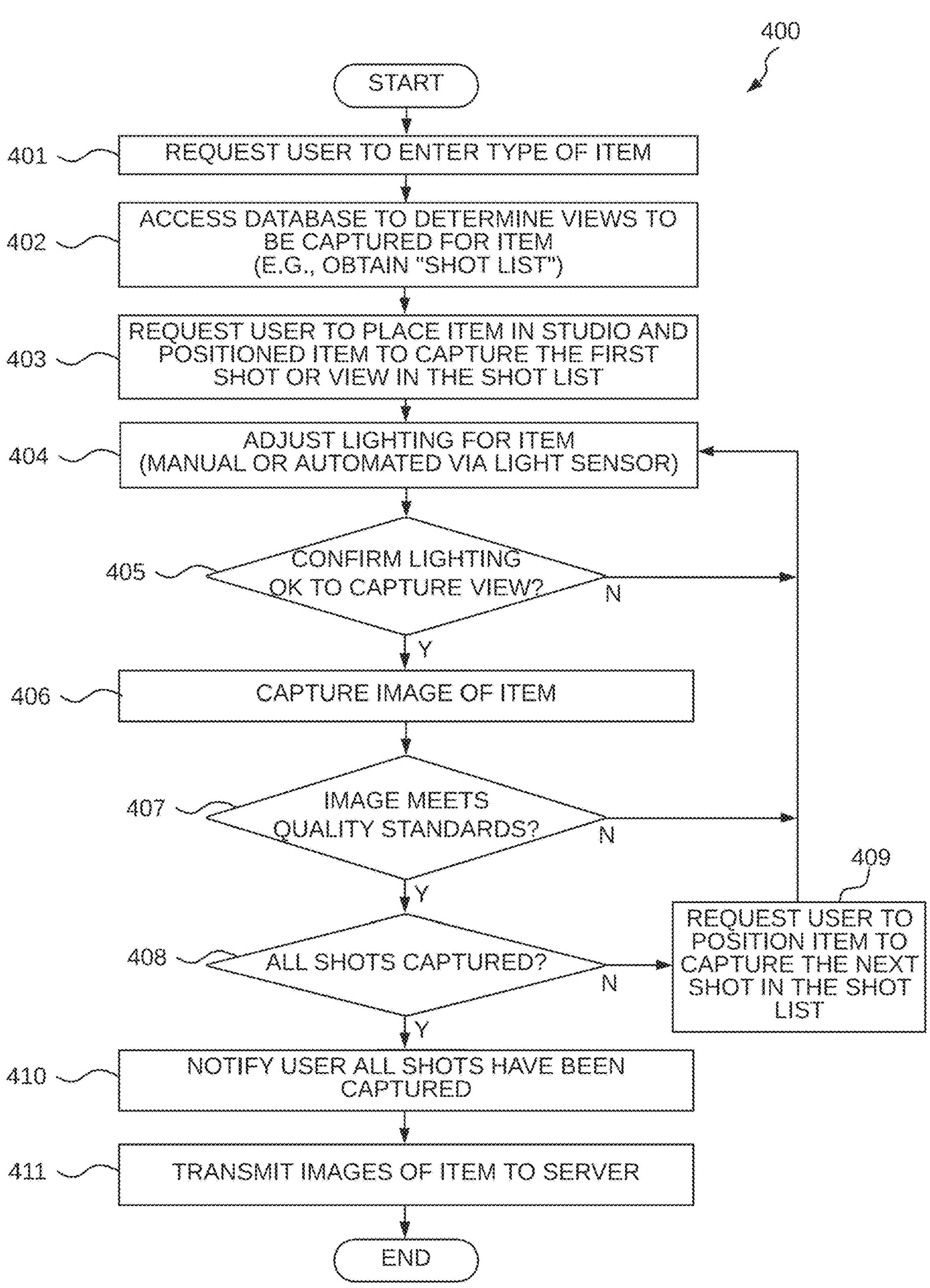
FIG. 4 is a flowchart of a method for guiding a user to operate a small studio image capture system in accordance with one novel aspect.

FIG. 4 is a flowchart of a method 400 for guiding a user to operate a stacked studio image capture system in accordance with one novel aspect. Method 400 is suitable for use with aspects of the stacked studio system shown in FIGS. 1-3. In one embodiment, the camera device 300 stores instructions of the application 308 that are executed or interpreted by the processor 301 to cause the processor 301 to perform the functions described herein.

At block 401, a user is requested to enter a type of item for image capture. For example, the application 308 generates a user interface on a screen display that prompts the user to enter the type of item to be photographed. The user may also scan a code or tag of the item as the user input.

At block 402, a database is accessed using the received user input to determine a "shot list" that represents the views of the item to be captured. In addition to the "shot list" priority status options are obtained from the database that identify additional information, such as extra images to be captured for the item. For example, based on the user input about the type of item to be photographed, the processor 301 accesses the item database 309 to determine the types and number of views, light conditions, and other information that will be used to photograph the item.

At block 403, the user is requested to place the item in the studio and position the item to capture the first view or first shot in the shot list. For example, the application 308 generates screen displays that prompt the user to place the item in the studio to capture a particular view of the item.

At block 404, the lighting in the studio is adjusted to capture the view of the item. For example, the application 308 generates a user interface on a screen display that prompts the operator to adjust the lighting in the studio. In one embodiment, the lighting is adjusted automatically by the application 308 based on detected lighting conditions. In another embodiment, the lighting is adjusted manually by the user.

At block 405, a determination is made as to whether the lighting has been properly adjusted. For example, the processor 301 receives lighting information from the light sensor 313 and uses this information to determine if the lighting is properly adjusted. If the lighting has not been properly adjusted, the method returns to block 404. If the lighting has been properly adjusted, the method proceeds to block 406. For example, the lighting is compared to lighting parameters obtained from the database to determine if the lighting is properly adjusted for the item.

At block 406, an image of the item is captured. For example, the application 308 generates a user interface presented on a screen display that prompts the user to preview and capture an image of the item having the current view and lighting conditions.

At block 407, a determination is made as to whether the image meets selected quality standards. For example, the processor 301 determines if the captured image meets the selected quality standards with respect to white balances, focus, color correction, lighting, and any other image quality standard. If the image does not meet selected quality standards, the method proceeds to block 404 where the lighting is checked and the image is recaptured. Recapture of the image is less expensive than having the image manually retouched to correct quality problems. If the image meets the quality standards, the method proceeds to block 408.

At block 408, a determination is made as to whether all shots of the item have been captured. The processor 301 makes this determination from information obtained from the item database 309. For example, if information from the item database indicates that three views of the item are to be captured, the processor 301 determines if all three views have been captured. If all views of the item have not been captured, the method proceeds to block 409. If all views of the item have been captured, the method proceeds to block 410.

At block 409, the user is requested to position the item for so that the next view of the item can be captured. For example, the processor 301 generates a user interface on the screen display to guide the user to position the item for the next view to be captured. The method then proceeds to block 404 to adjust the lighting and capture an image of the next view of the item.

At block 410, the user is notified that all views for the item have been captured (e.g., the shot list is complete).

At block 411, the images of the item are transmitted to an image server. For example, the processor 301 uses the API 304 to transmit images of the item over a network channel 313 to an image server.

Thus, method 400 performs operations for guiding a user to operate a stacked studio image capture system. It should be noted that the operations of method 400 are exemplary and that the operations can be added to, deleted, rearranged, or otherwise modified within the scope of the embodiments.

Figure 5:
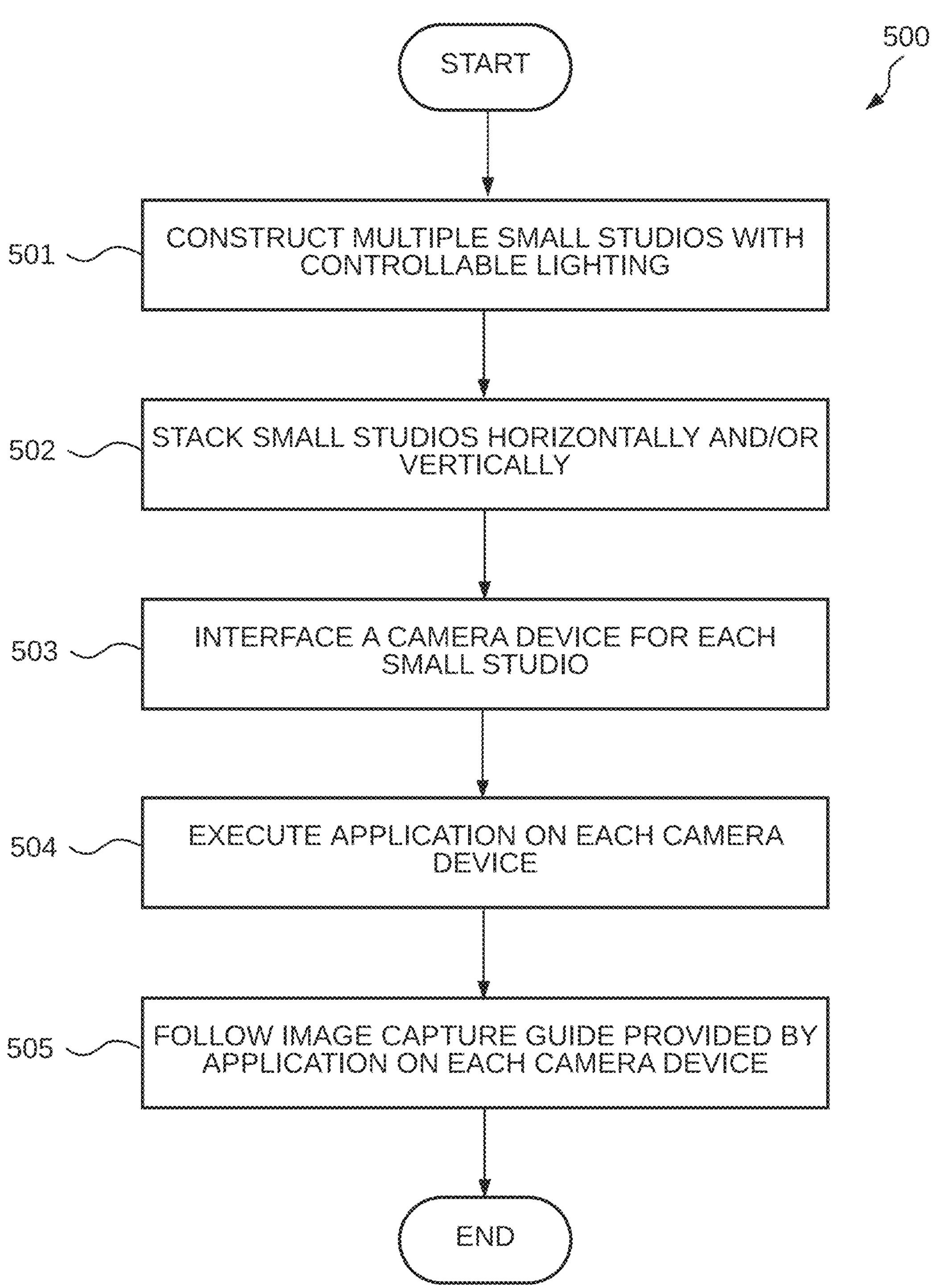
FIG. 5 is a flowchart of a method for forming a small studio system in accordance with another novel aspect.

FIG. 5 is a flowchart of a method 500 for forming a stacked studio system in accordance with another novel aspect. For example, method 500 can be used to form the stacked studio system shown in FIG. 1.

At step 501, multiple small studios are constructed with controllable lighting. For example, small studios as illustrated in FIG. 2 are constructed.

At step 502, the small studios are stacked horizontally and/or vertically to form an organized and compact stacked multi-studio configuration. For example, the small studios are stacked as illustrated in FIG. 1.

At step 503, a camera device is interfaced with each small studio. In one embodiment, the camera device utilizes wireless interfaces, such as Wi-Fi or Bluetooth interfaces, to control lighting and other aspects of the small studio. In one embodiment, each small studio is assigned a camera, and in another embodiment, one camera is used and selectively moved and switched between multiple stacked studios.

At block 504, an application executes on each camera device to control aspects of each small studio and to capture images of items. For example, the application guides the user or operator to set up an item in a small studio, adjust the lighting, and capture a particular view of the item.

At block 505, the application provides a guided set of user interfaces on a display screen that guides a user to capture images of items. The guidance includes instructions for lighting adjustment, view selection, previewing images, capturing of images, and image transmission to external servers.

Thus, method 500 performs operations for forming a small studio system in accordance with one embodiment. It should be noted that the operations of method 500 are exemplary and that the operations can be added to, deleted, rearranged, or otherwise modified within the scope of the embodiments.

Figure 6:
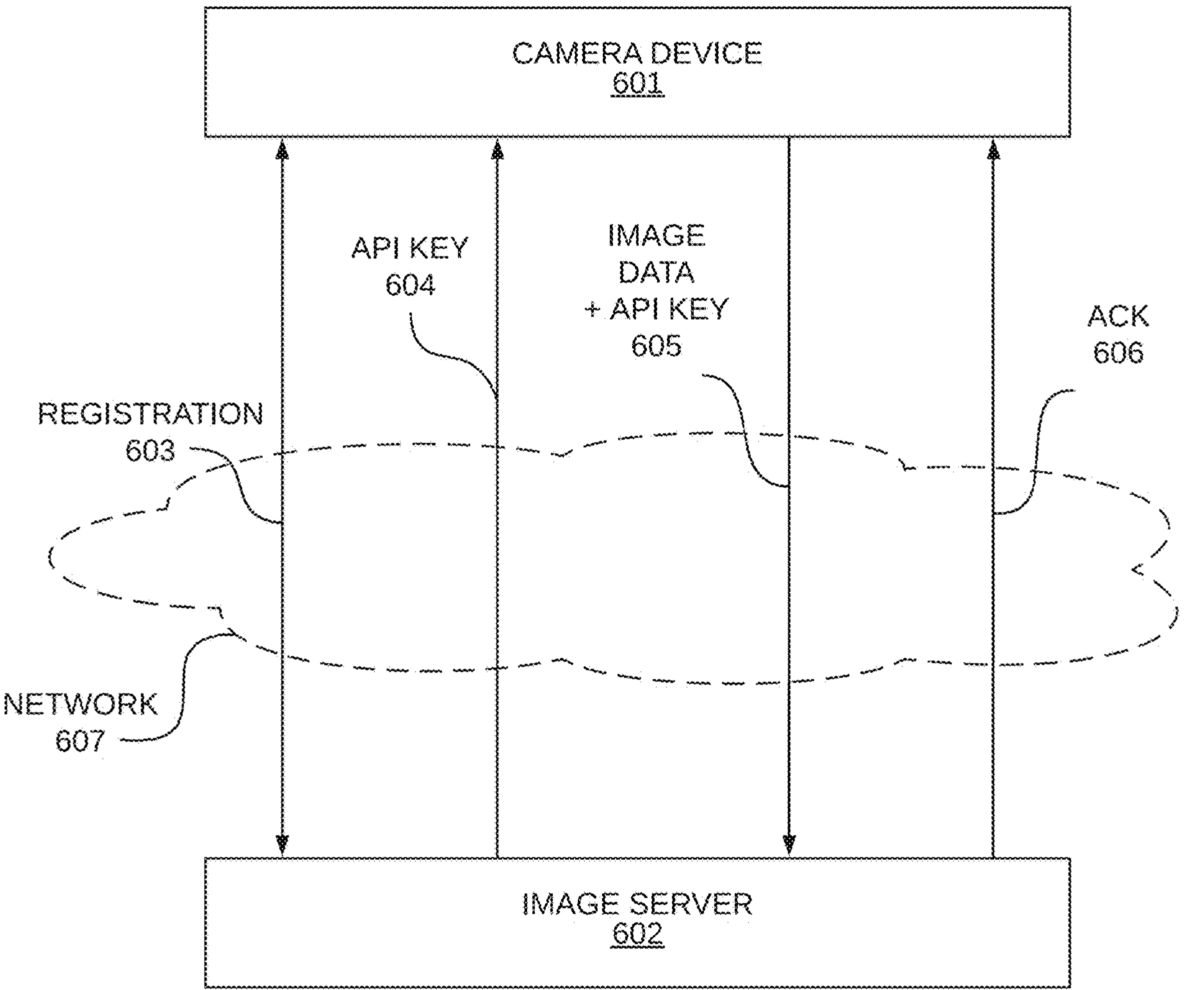
FIG. 6 is a diagram showing operation of a camera device interfacing with an image server in accordance with one embodiment.

FIG. 6 is a diagram showing operation of a camera device interfacing with an image server in accordance with one embodiment. In one embodiment, a camera device 601 performs a registration process 603 with an image server 602. After registration, the image server 602 responds by sending an API key 604 to the camera device 601, which can be used by the camera device 601 to access the image server 602. The camera device 601 sends captured images of items (along with the API key) 605 to the image server 602 for further processing. The image server 602 responds by transmitting an acknowledgment 606 back to the camera device 601.

Figure 7:
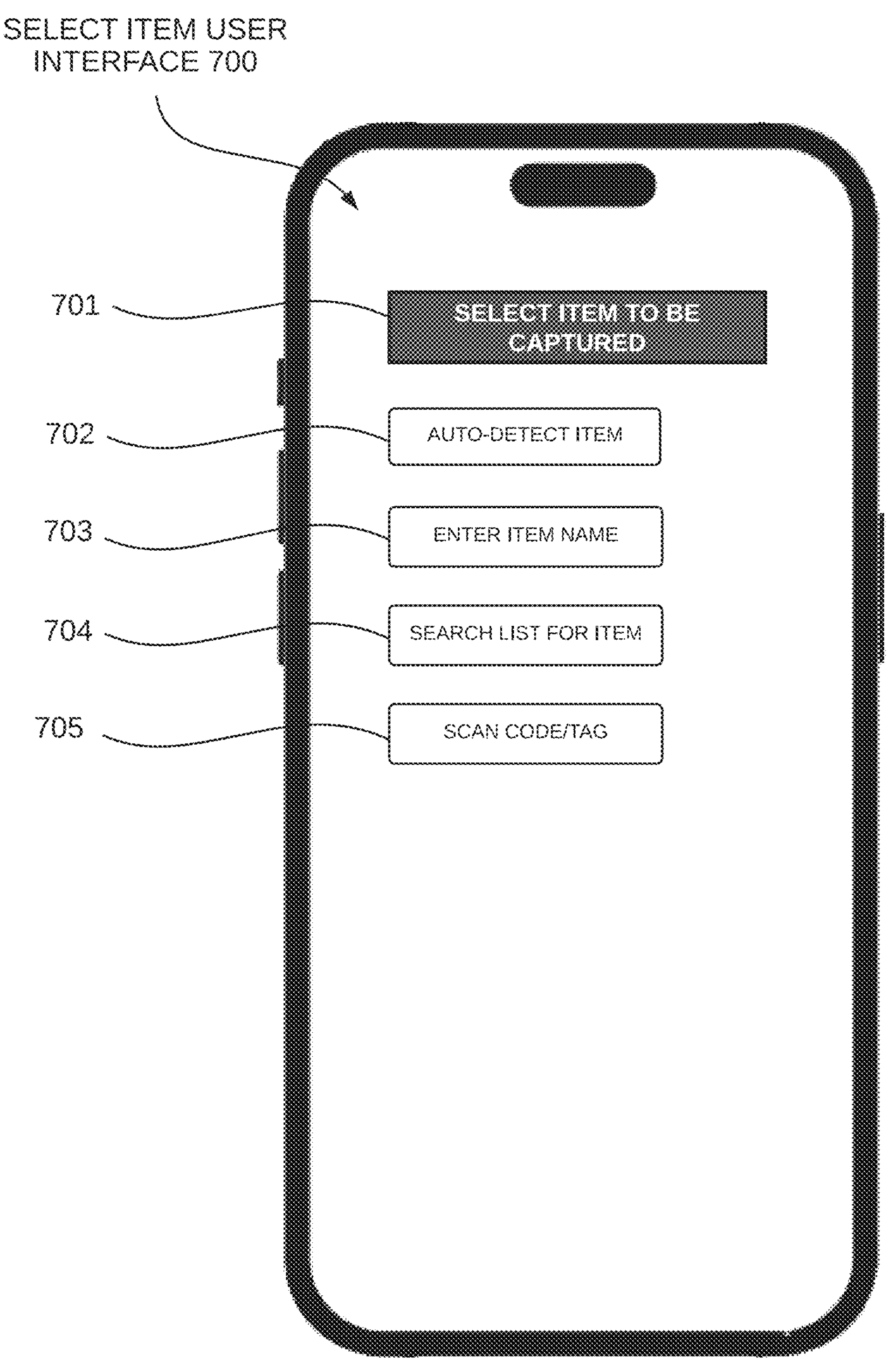
FIG. 7 is a diagram of a select item user interface that guides an operator to select an item to be photographed.

FIG. 7 shows a camera device select item user interface 700. The select item user interface 700 guides an operator to select an item to be photographed. The select item user interface 700 includes a heading 701 that notifies the operator that the interface presented on the screen will guide the operator to select an item to be captured. The select item user interface 700 includes an auto detect selection 702, which can be used to automatically detect the type of item to be photographed. For example, the processor 301 captures an image of the item and searches the database 309 to identify the item. In another embodiment, an enter item name field 703 is provided in which the user selects from a dropdown or inputs the name of the item. For example, the user selects or enters a shoe, purse, or glove as an item name. A search list selection 704 is also provided in which the camera device displays a list of items in the database 309. In still another entry mode, a scan code/tag selection 705 is provided in which a user can scan a code or tag on an item and that code is then used to access a database to obtain information about the item. The operator selects the item to be photographed from the displayed list.

Figure 8:
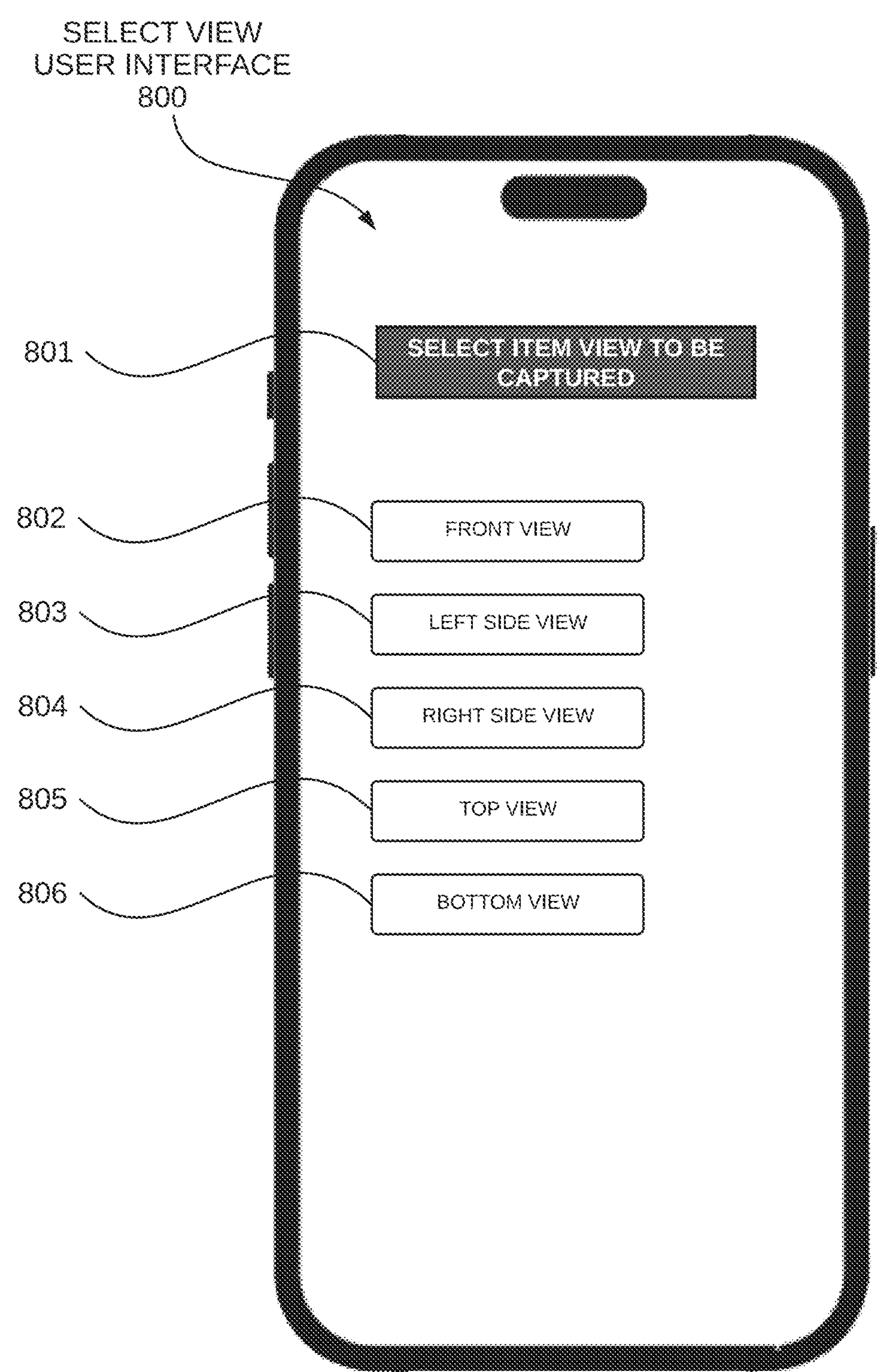
FIG. 8 is a diagram of a select view user interface that guides an operator to select a view for the item to be photographed.

FIG. 8 shows a camera device select view user interface 800. The select view user interface 800 guides an operator to select a view for the item to be photographed. The select view user interface 800 includes a heading 801 that notifies the operator that the interface presented on the screen will guide the operator to select a view for the item to be captured. In this embodiment, the operator can select from a front view 802, a left side view 803, a right side view 804, a top view 805, and a bottom view 806. In other embodiments, requested views depending on the type of item being captured.

Figure 9:
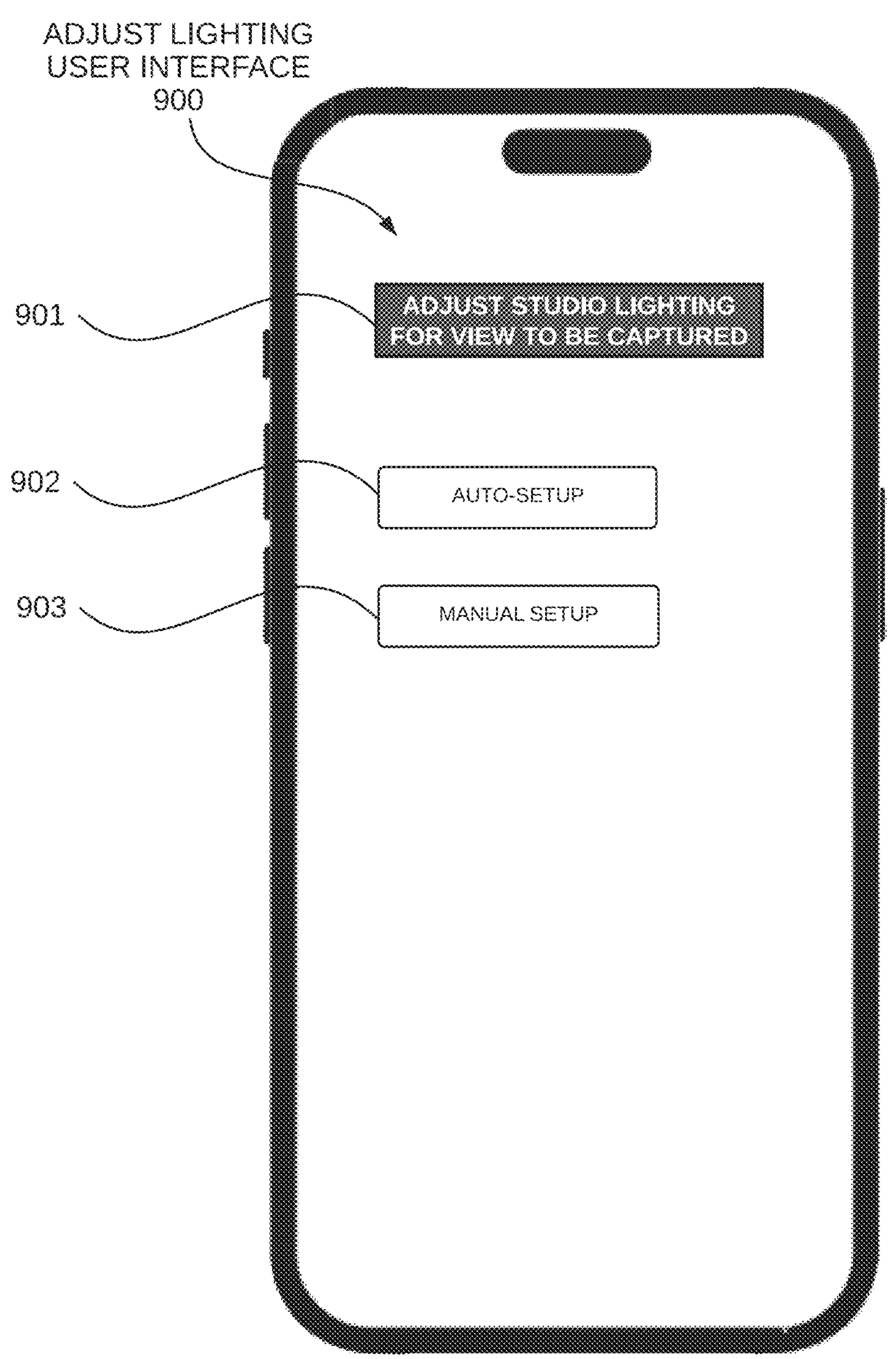
FIG. 9 is a diagram of an adjust light user interface that guides an operator to adjust studio lighting for the view of the item to be photographed.

FIG. 9 shows a camera device lighting adjustment user interface 900. The lighting adjustment user interface 900 guides an operator to adjust studio lighting for the view of the item to be photographed. The lighting adjustment user interface 900 includes a heading 901 that notifies the operator that the interface on the screen will guide the operator to adjust the studio lighting for the view to be captured. The selections from this user interface are auto setup 902 and manual setup 903. The auto setup 902 will automatically configure the lighting in the studio. The processor 301 controls the lighting while the light sensor senses the light reflected off the item so that the processor 301 can determine the correct intensity and characteristics of the lighting to be used to capture the image. The manual setup 903 can be used by the operator to manually adjust the lighting to be sure that the item is properly illuminated. In one embodiment, the manual setup selection 903 provides a new drop down dialogue box that provides the user with additional advanced features for lighting adjustment.

Figure 10:
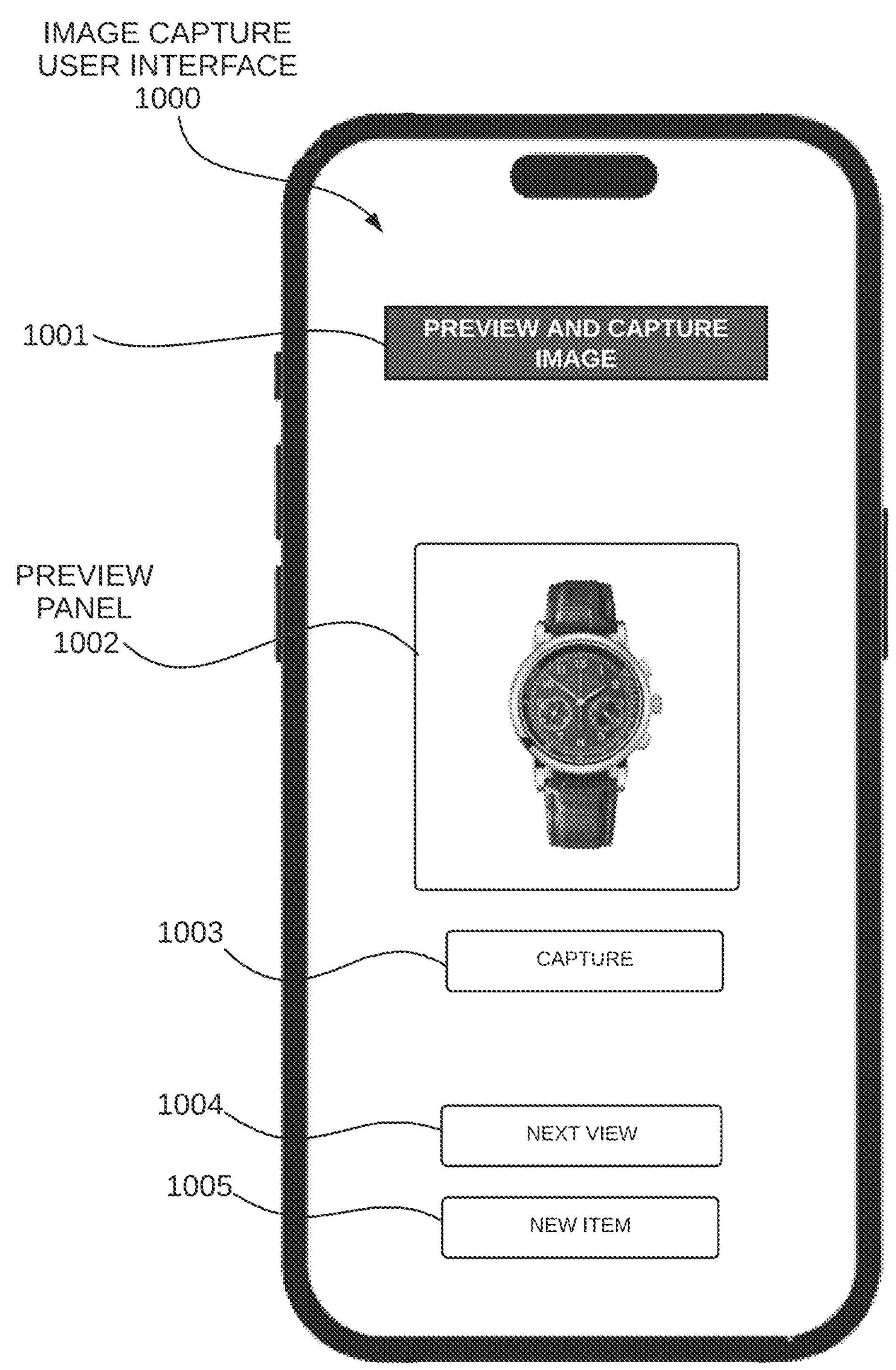
FIG. 10 is a diagram of an image capture user interface that guides an operator to preview and capture an image of an item.

FIG. 10 shows a camera device image capture user interface 1000. The image capture user interface 1000 guides an operator to preview and capture an image of an item. The image capture user interface 1000 includes a heading 1001 that notifies the operator that this user interface will guide the operator to preview and capture an image of the item. This image capture user interface 1000 includes a preview panel 1002 that shows an image of an item to be captured. The image capture user interface 1000 also includes a capture button 1003. The capture button 1003 triggers capture of the image shown in the previous interface. A next view button 1004 is used to advance the program to capture the next view of the item and will return to the select view user interface 800 shown in FIG. 8. A new item selection 1005 will advance the program to the beginning to present the select item user interface 700 shown in FIG. 7 so that the operator can select a new item to be captured.

Figure 11:
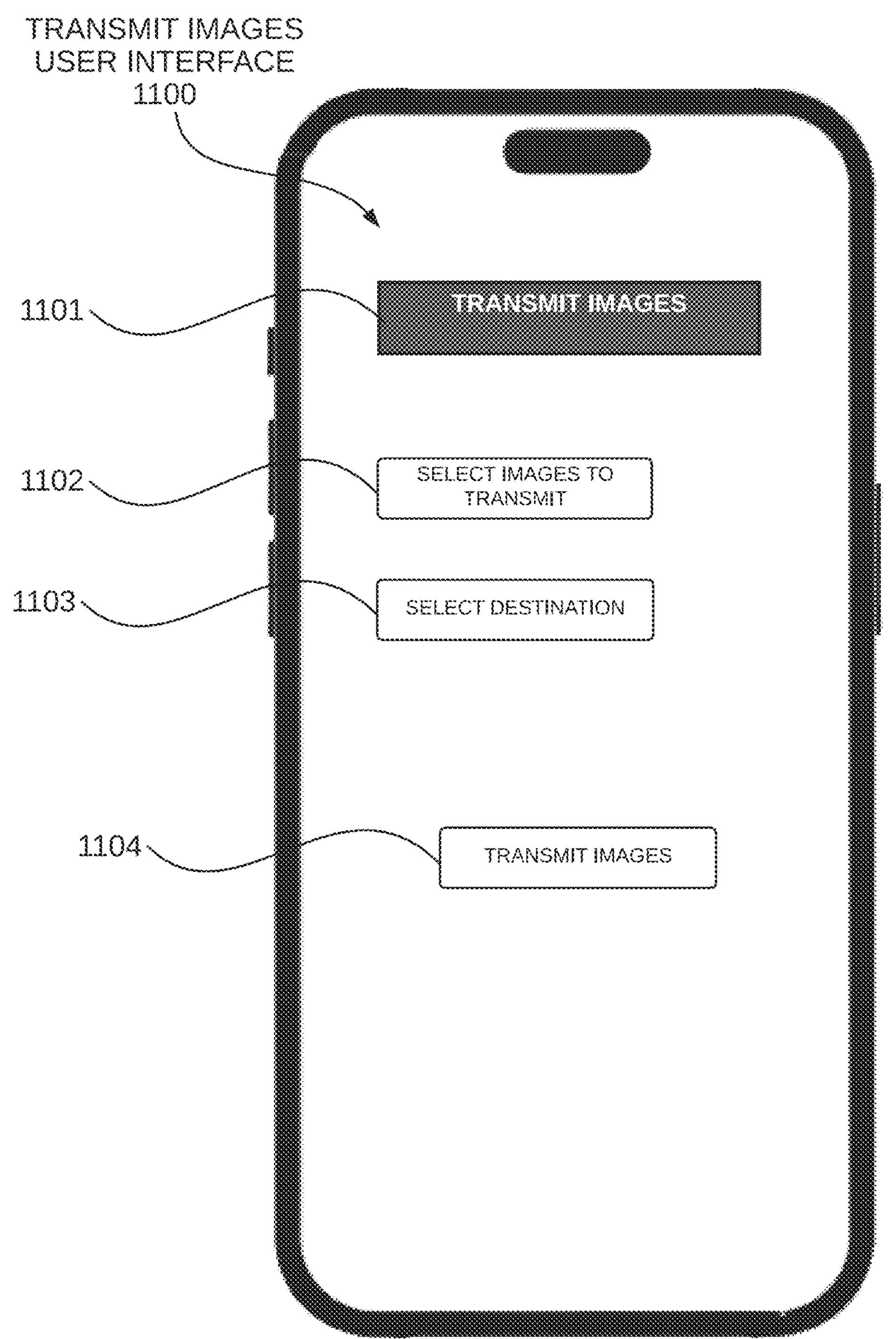
FIG. 11 is a diagram of a transmit image user interface that guides an operator to transmit captured images to an image server.

FIG. 11 shows a camera device transmit images user interface 1100. The transmit images user interface 1100 guides an operator to transmit captured images to an image server. The transmit images user interface 1100 includes a heading 1101 that notifies the operator that this interface will guide the operator to transmit captured images. The transmit images user interface 1100 includes a selection button on 1102 that allows the operator to select the images to be transmitted. In one embodiment, the operator is guided through captured images that are stored on a device from which the operator can select. The transmit images user interface 1100 also includes a destination selection button 1103. The destination selection button 1103 provides functionality allowing the operator to select a destination or external system to which the images are to be transmitted. The transmit images user interface 1100 also includes a transmit image button 1104 that will initiate the transfer or transmission of images to the selected destination.

Figure 12:
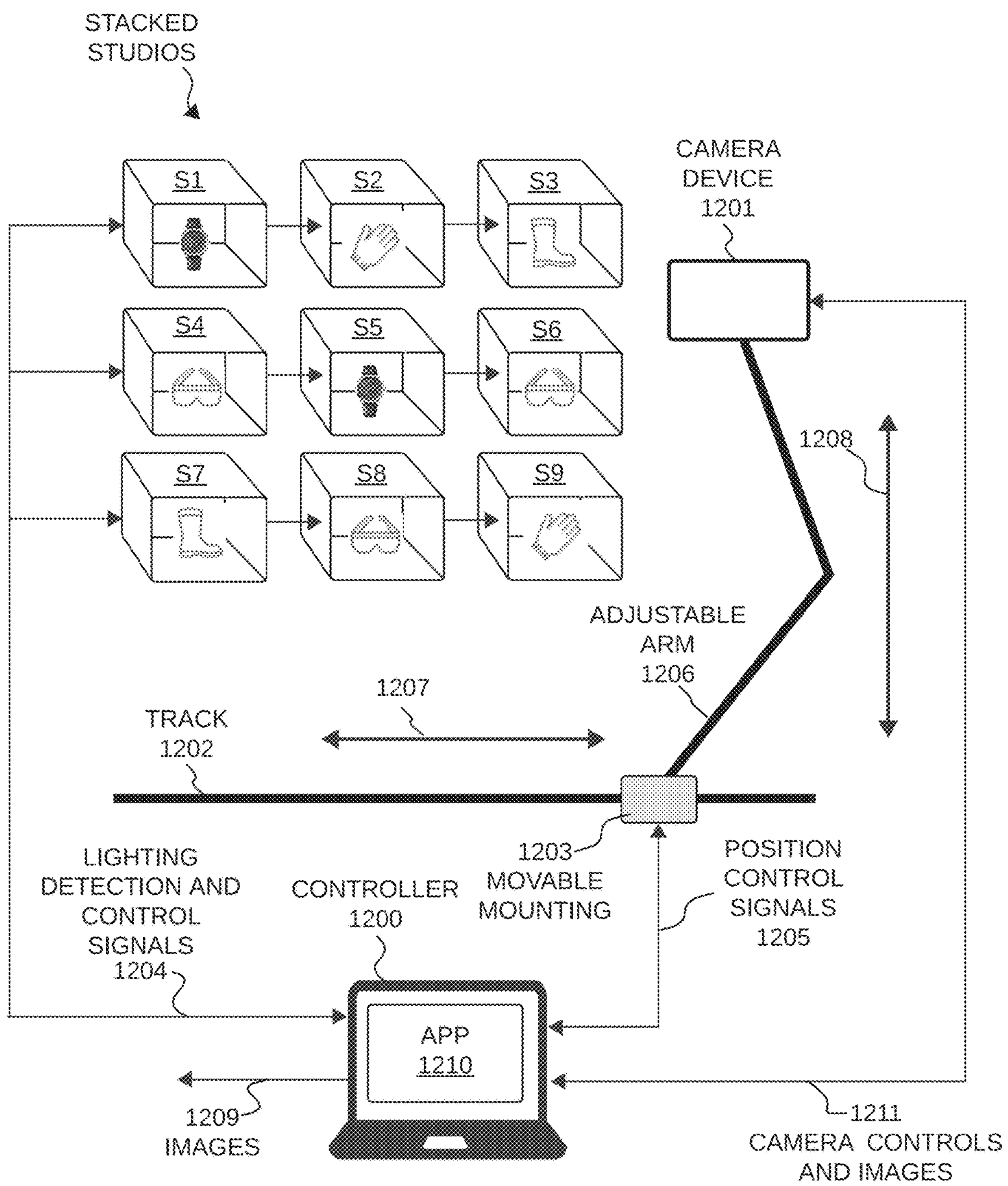
FIG. 12 is a diagram of a system for small studio horizontal and vertical densification and automation constructed in accordance with another embodiment.

FIG. 12 is a diagram of stacked studios with a movable camera device and central controller constructed in accordance with the invention. The stacked studios comprises nine studios (S1-S9). Also provided is a camera device 1201 that is connected to an adjustable arm 1206. The adjustable arm 1206 is mounted to a movable mounting 1203 that is configured to slide along a track 1202. A controller 1200 executes an application 1210 that allows a user to control the operation of the camera device 1201 to capture images of items in the studios (S1-S9).

In one embodiment, the controller 1210 outputs position control signals 1205 that control the adjustable arm 1206 to move the camera device 1201 up or down as indicated by indicator 1208. The position control signals 1205 also control the movable mounting 1203 to slide left or right along the track 1202 as indicated by indicator 1207. Thus, the position control signals 1205 are configured to move the position of the camera device 1201 in front of the studios (S1-S9) to capture images of items in these studios.

In one embodiment, the controller 1200 also communicates lighting detection and control signals 1204 to the studios (S1-S9). Lighting detection signals are received by the controller 1200 from the studios and are used to determine the lighting conditions in each studio. Lighting control signals are transmitted by the controller 1200 to the studios to control the lighting conditions in each studio. Thus, the controller 1200 can detect and adjust the lighting conditions in any of the studios to facilitate image capture of an item.

In one embodiment, the controller 1200 communicates camera control signals and images 1211 with the camera device 1201. The controller 1200 outputs camera control signals to control the camera settings, such as exposure and shutter speed, that are used by the camera device to capture an image. The controller 1200 receives the images captured by the camera device 1201 and processes these images to determine if the captured images meet selected quality standards.

In one embodiment, once the controller 1200 has captured images of an item that meet the quality standards, the controller 1200 transmits these images 1209 to a server or other network entity. Thus, a user of the system interacts with the application 1210 running on the controller 1200 to move the camera device to capture images of items in any of the nine studios. This greatly reduces time and labor to capture the desired item images.

Figure 13:
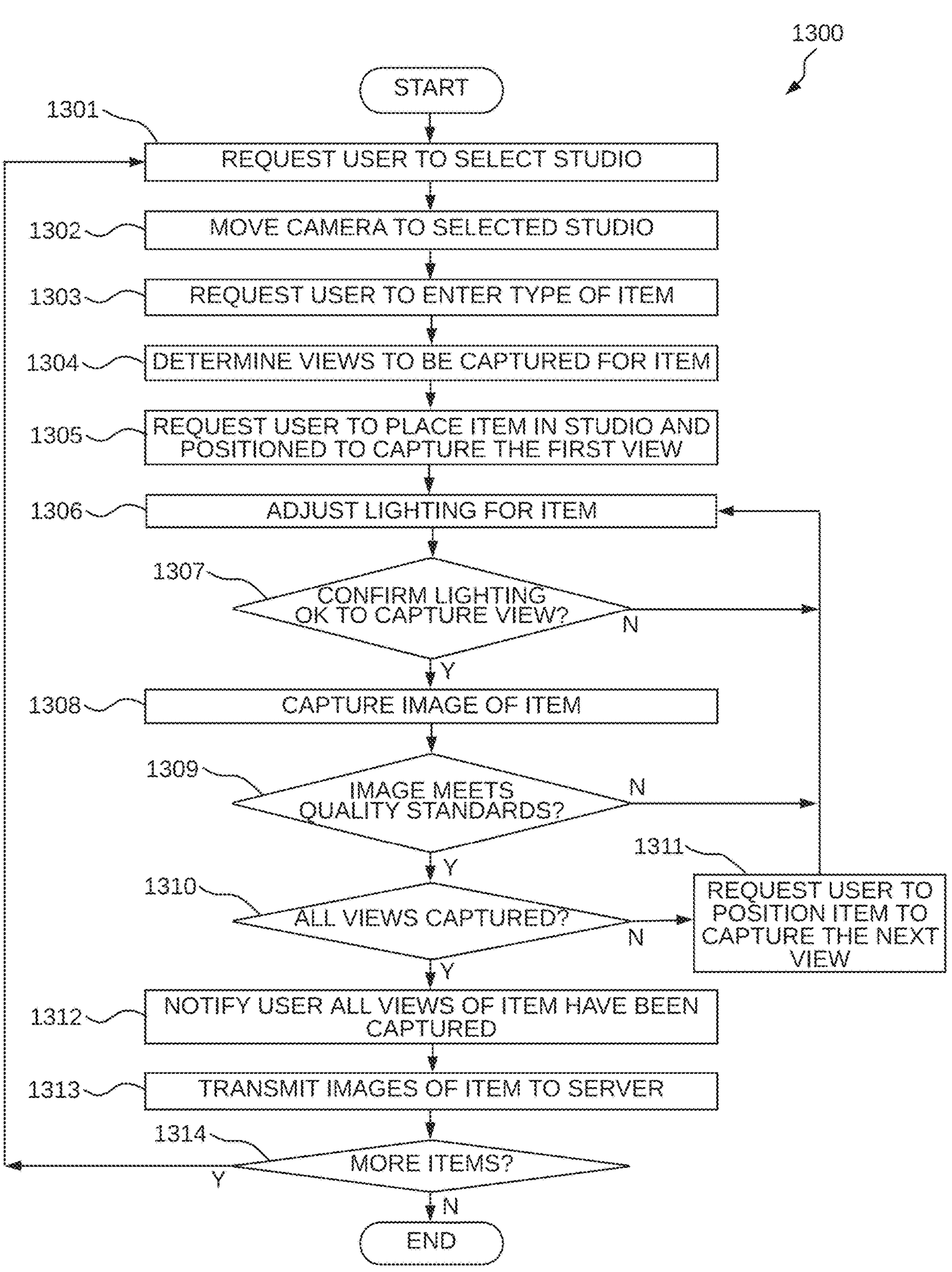
FIG. 13 is a flowchart of a method for guiding a user to operate a stacked studio image capture system.

FIG. 13 is a flowchart of a method 1300 for guiding a user to operate a system having stacked studios to capture item images. For example, method 1300 is suitable for use with the stacked studios shown in FIG. 12. In one embodiment, the controller 1200 executes the application 1210 to perform method 1300.

At block 1301, a user selects one of the stacked studios to be used for image capture of an item. For example, the application 1210 asks the user to select a studio and the user responds by selecting any one of the studios S1 through S9.

At block 1302, the system moves the camera device to the selected studio. For example, the controller 1200 outputs the position control signals 1205 to position the camera (up, down, left, right) in front of the selected studio.

At block 1303, the user enters the type of item to be photographed in the selected studio. For example, the application 1210 asks the user to enter a type of item to be photographed. For example, the user responds by entering a watch, glove, glasses, boot, or other type of item.

At block 1304, the number and types of views to be captured are determined for the item. In one embodiment, the controller 1200 searches an item database, such as the item database 309 shown in FIG. 3, to determine parameters for capturing images of the selected item. For example, the number of views, direction of view, lighting effects and other information for the item are derived from the item database.

At block 1305, the user is requested to place the item in the selected studio. The controller 1200 displays a screen that asks the user to place the selected item in the selected studio.

At block 1306, lighting in the selected studio is adjusted. In one embodiment, the controller 1200 receives lighting detection signals 1204 that indicate the lighting conditions in the selected studio. The controller 1200 can output lighting control signals 1204 that control the lighting in the studio to achieve specific lighting effects. The process of adjusting the lighting and detecting the light can be repeated until the desired lighting of the item is achieved. In one embodiment, information about the item stored in the item database includes lighting information that is used to set the lighting in the selected studio.

At block 1307, a determination is made as to whether the lighting in the selected studio is appropriate to capture an image of the item. In one embodiment, the controller 1200 determines if the detected lighting is acceptable based on the information about the item obtained from the item database. If the lighting is acceptable, the method proceeds to block 1308. If the lighting is not acceptable, the method proceeds to block 1306.

At block 1308, an image of the item is captured by the camera device. In one embodiment, the controller 1200 displays a preview of the item image to the user and the user provides user input that indicates that the image is to be captured.

At block 1309, a determination is made as to whether the image quality of the captured image meets selected quality standards. In one embodiment, the controller 1200 makes this determination. If the capture image quality is acceptable, the method proceeds to block 1310. If the captured image quality is not acceptable, the method proceeds to block 1306.

At block 1310, a determination is made as to whether all views of the item have been captured. For example, the controller 1200 determines the number of views of the item to be captured based on the information stored in the item database. If all the views of the item have been captured, the method proceeds to block 1312. If all the views of the item have not been captured, the method proceeds to block 1311.

At block 1311, the user is requested to reposition the item to capture the next view. In one embodiment, the controller 1200 causes a user interface to be presented on a display that guides the user to reposition the item for the next view. The method then proceeds to block 1306.

At block 1312, the user is notified that all views for the selected item have been captured. In one embodiment, the controller 1200 causes a user interface to be presented that informs the user that all views of the item have been captured.

At block 1313, the captured views for the item are transmitted to an external server. In one embodiment, the controller 1200 transmits the captured images 1209 of the item to an external server or device.

At block 1314, a determination is made as to whether there are additional items that require image capture. For example, there can be additional items to be photographed in other studios. If there are additional items to be photographed, the method proceeds to block 1301. If there are no other items to be photographed, the method ends.

Thus, method 1300 performs a method for operating a stacked studio to capture item images in accordance with one embodiment. It should be noted that the operations of method 1300 are exemplary and that the operations can be added to, deleted, rearranged, or otherwise modified within the scope of the embodiments.

Figure 14:
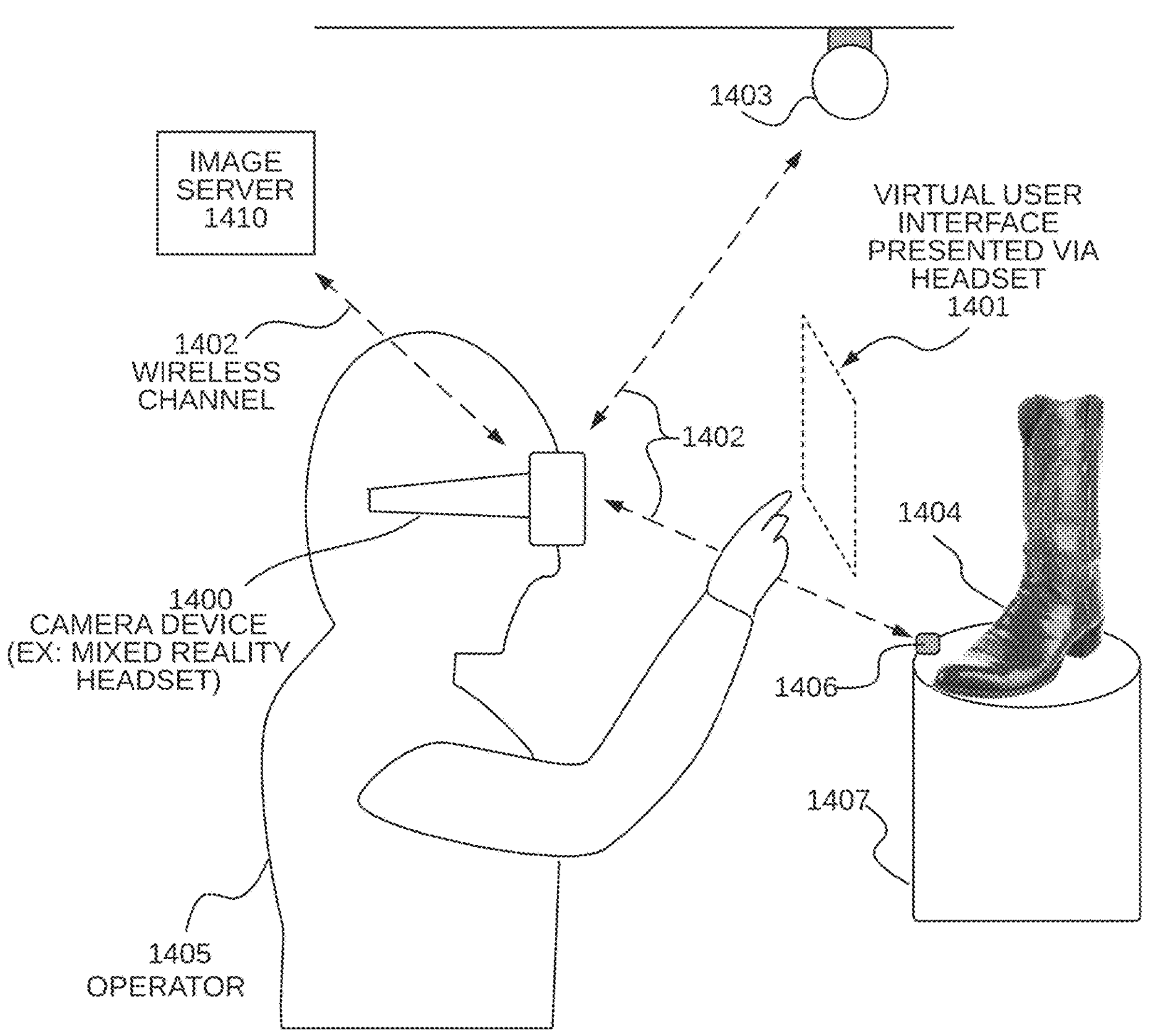
FIG. 14 is a diagram of a headset camera device in accordance with another embodiment.

FIG. 14 is a diagram of a headset camera device 1400 in accordance with another embodiment. The headset camera device 1400 is a virtual reality (VR) or augmented reality (AR) headset device wearable by an operator 1405. The mixed reality headset device 1400 displays a virtual user interface 1401 that is overlaid onto a view of an item 1404 to be photographed. The item 1404 is placed on a stand or podium 1407 and a light sensor 1406 is used to obtain lighting information about the light conditions that exist around the item 1404. The headset 1400 utilizes a wired or wireless communication channel 1402 to communicate with lighting device 1403, light sensor 1406, and an image server 1410.

Using the virtual interface 1401, the operator 1405 is able to adjust the lighting device 1403 and capture an image of the item 1404. The lighting device 1403 is adjusted manually or automatically via image capture settings preconfigured based on item type or taxon. In this example, the headset 1400 communicates wirelessly. The headset 1400 uses the wireless channel 1402 to obtain lighting information from the light sensor 1406 and adjusts the lighting device 1403 to provide proper illumination to the item 1404.

After the lighting device 1403 is adjusted to appropriate lighting condition settings, the operator 1405 interacts with the virtual user interface 1401 of the headset 1400 to capture an image of the item 1404. This process is repeated to capture multiple views of item 1404 in various orientations and configurations. Once all the views of item 1404 are captured, the headset transmits the captured images to the image server 1410 using the wireless channel 1402.

In various embodiments, the operator 1405 wears the headset 1400 and navigates through a receiving facility or warehouse. In one example, the receiving facility or warehouse intakes and processes items that are to be photographed for single stock keeping unit (SKU) inventory. The headset 1400 detects in which studio or station the operator 1405 is in using proximity sensors, Global Positioning System (GPS) sensors, Near Field Communication (NFC) sensors, Bluetooth sensors, wireless sensors, or other tag-type sensors in which the headset 1400 is able to detect location within the warehouse. The headset 1400 guides the operator 1405 through various studios or stations within the receiving facility or warehouse, such as the stacked studios shown in FIG. 1.

At each studio or station, the headset 1400 instructs the operator 1405 to capture various images of each item at each studio or station. Once the required views are obtained for the item type or taxon, the headset 1400 notifies the operator 1405 and the operator 1405 causes the item to be transferred to another location for further intake processing.

In another embodiment, items are circulated through the receiving facility or warehouse and the operator 1405 remains within a studio or station area. For example, items to be processed are circulated via a carousel conveyor-type system. Items are removed from the conveyor and the operator 1404 is guided via headset 1400 to capture images of the item. Once the required views are obtained for the item type or taxon, the headset 1400 notifies the operator 1405 and the operator 1405 causes the item to be transferred to another location for further intake processing, either via the carousel conveyor-type system or via another conveyor.

Figure 15:
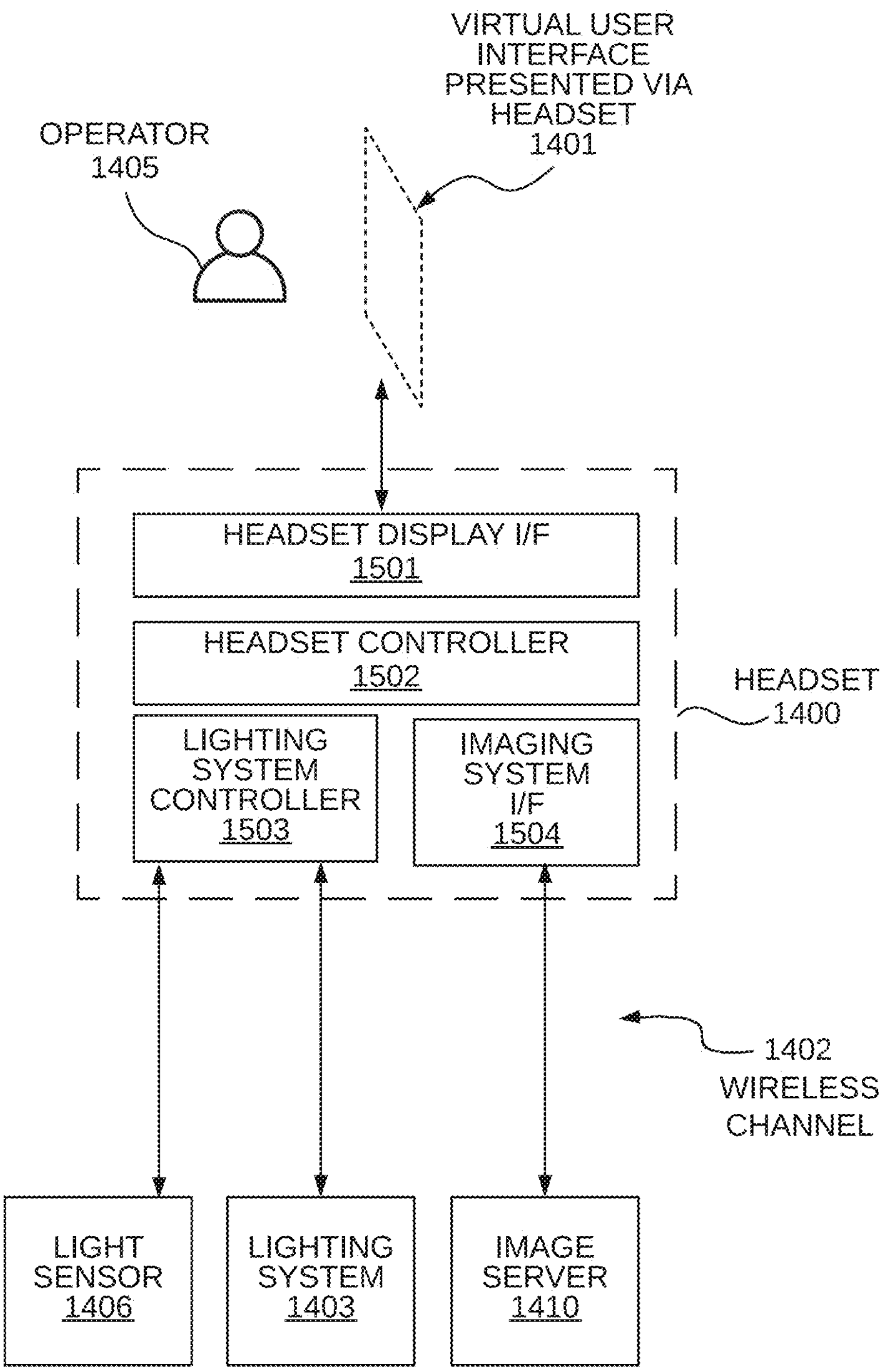
FIG. 15 is a detailed block diagram of the headset camera device shown in FIG. 14.

FIG. 15 is a detailed block diagram of the headset camera device 1400 shown in FIG. 14. The headset camera device 1400 comprises a headset display interface (I/F) 1501, headset controller 1502, lighting system controller 1503, and imaging system interface 1504. The headset controller 1502 controls all hardware of the mixed reality headset 1400. The headset display I/F 1501 is supported by a frame 1603 (shown in FIG. 16). In this embodiment, the headset display I/F 1501 is a laminated glass display and the frame 1603 is formed from an aluminum or other suitable metal frame having a flexible cushion (not shown) and attached to an adjustable headband.

During operation, the operator 1405 interacts with a virtual user interface 1401 provided by the headset display interface 1501. The controller 1502 provides options through the virtual interface 1401 for the operator to select items, determine views to be captured, and capture item images.

The lighting system controller 1503 receives sensor information from the light sensor 1405 using the wireless channel 1402. The lighting system controller 1503 then determines lighting adjustments and sends these adjustments to the lighting system 1403 using the wireless channel 1402. The lighting adjustments are used to adjust the lighting to provide the proper illumination to capture images of the item. Once the lighting is properly adjusted, the lighting system controller 1503 signals the controller 1502 that images of the item can be captured. The controller 1502 presents an image capture screen on the virtual user interface 1401 that allows the operator 1405 to control the image capture process.

Once the image capture is complete, the headset controller 1502 sends the images through the imaging system interface 1504 to the image server 1410 using the wireless channel 1402. In another embodiment, the images are maintained on the headset 1400 and later transferred to the image server 1410.

Figure 16:
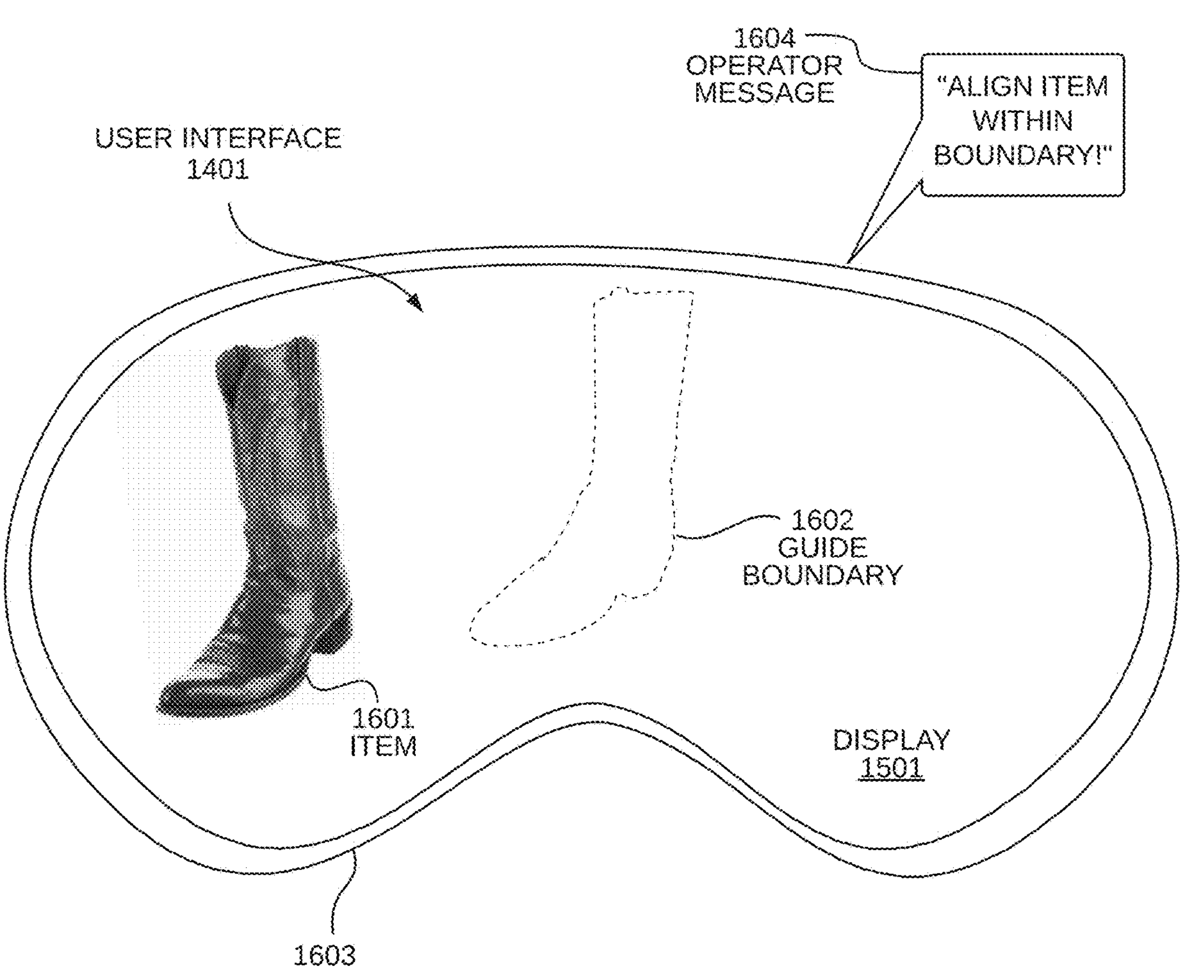
FIG. 16 is a diagram of a user interface provided by the headset camera device shown in FIG. 14 that guides an operator to orient and align an item for appropriate image capture.

FIG. 16 is a diagram of the user interface 1401 provided by the headset camera device 1400 that guides an operator to orient and align an item for appropriate image capture. As shown in FIG. 16, the headset camera device 1400 provides the user interface 1401 on display 1501 that is visible to the operator. Within the user interface 1401, the operator views an image of the item 1601 to be photographed and a guide boundary 1602. To properly capture an image of the item 1601, the operator 1405 adjusts the item 1601 until the item 1601 appears within the guide boundary 1602. To facilitate this process, an operator message 1604 is provided that tells the operator to align the item within the guide boundary 1602. Once this alignment is complete, an image of the item can be captured.

Figure 17:
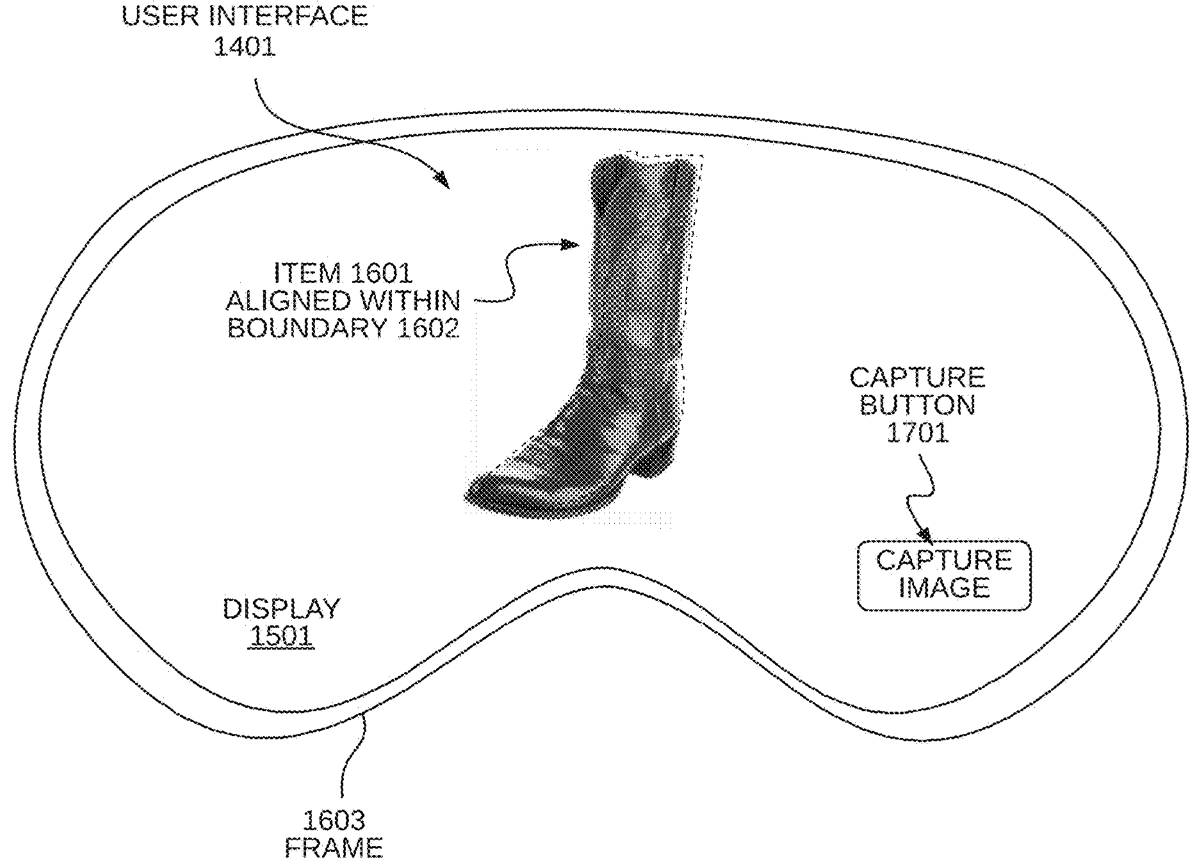
FIG. 17 is a diagram of a user interface provided by the headset camera device shown in FIG. 14 that guides the operator to capture an image of the item after detecting appropriate orientation and alignment.

FIG. 17 is a diagram of the user interface 1401 provided by the headset camera device shown in FIG. 14 that guides the operator to capture an image of the item after detecting appropriate orientation and alignment. As shown in FIG. 17, the operator has adjusted the item 1601 to be within the boundary 1602. Once this is detected, the controller 1502 controls the headset display interface 1501 to display a capture button 1701 to the operator 1405. The operator 1405 obtains an image of the desired view via the capture button 1701. In response to detecting selection of the capture button 1701 an image of the item 1601 is captured.

In various embodiments, for each item type or taxon, one or more guide boundaries are stored for each required view. The guide boundaries are stored on the headset 1400 or on a remote server that communicates the guide boundaries to the headset 1400. In this way, the headset 1400 guides the operator 1400 depending on taxon until all desired views are obtained.

FIG. 18 is a diagram of instructions 1800 for detecting when an item is aligned within a guide boundary for image capture. In one embodiment, the instructions 1800 are interpreted by processor 301 of the camera device 300 (shown in FIG. 3), by camera device 1201 or controller 1200 (shown in FIG. 12), or by headset controller 1502 (shown in FIG. 15). In other embodiments, the instructions 1800 run on a remote server, such as image server 602 (shown in FIG. 6), and detection results are communicated back to the camera device.

Instructions 1800 perform a variety of functions that enable guided image capture of items via an operator. Instructions 1801 load packages involved in running the instructions 1800. Instructions 1802 load an image of an item in grayscale. Instructions 1803 apply a binary threshold to the loaded image. Instructions 1804 find contours in the image. Instructions 1805 preprocess the image. Instructions 1806 find contours in an image, for example, of an image of an item. Instructions 1807 identify the largest contours of the item of the image and of the guide boundary. In this example, it is assumed that the largest contours in the images correspond to the guide boundary and the item. Instructions 1808 identify a centroid of the item contour. Instructions 1809 determine if the item centroid is within the guide boundary contour. Instructions 1810 represent logic for alerting the operator that the image is within the boundary. For example, in FIG. 17, capture button 1701 is presented to the user once item 1601 is within the boundary 1602.

Instructions 1811 represent logic for alerting the operator that the image is not within the boundary. For example, in FIG. 16, an operator message 1604 is generated alerting the user to properly align the item so that an acceptable image can be captured. Instructions 1812 define a path for a guide boundary image and for a detected image. Although in this example the instructions 1800 are in Python, it is appreciated that operations performed by instructions 1800 are implementable in other programming languages (for example, Swift, Kotlin, Java, or C++) using native device libraries (iOS, visionos, or Android Software Development Kit), using wrapper frameworks (for example, React Native or Flutter), using remote compute instances that perform various computation functions, or a combination of the above.

Figure 19:
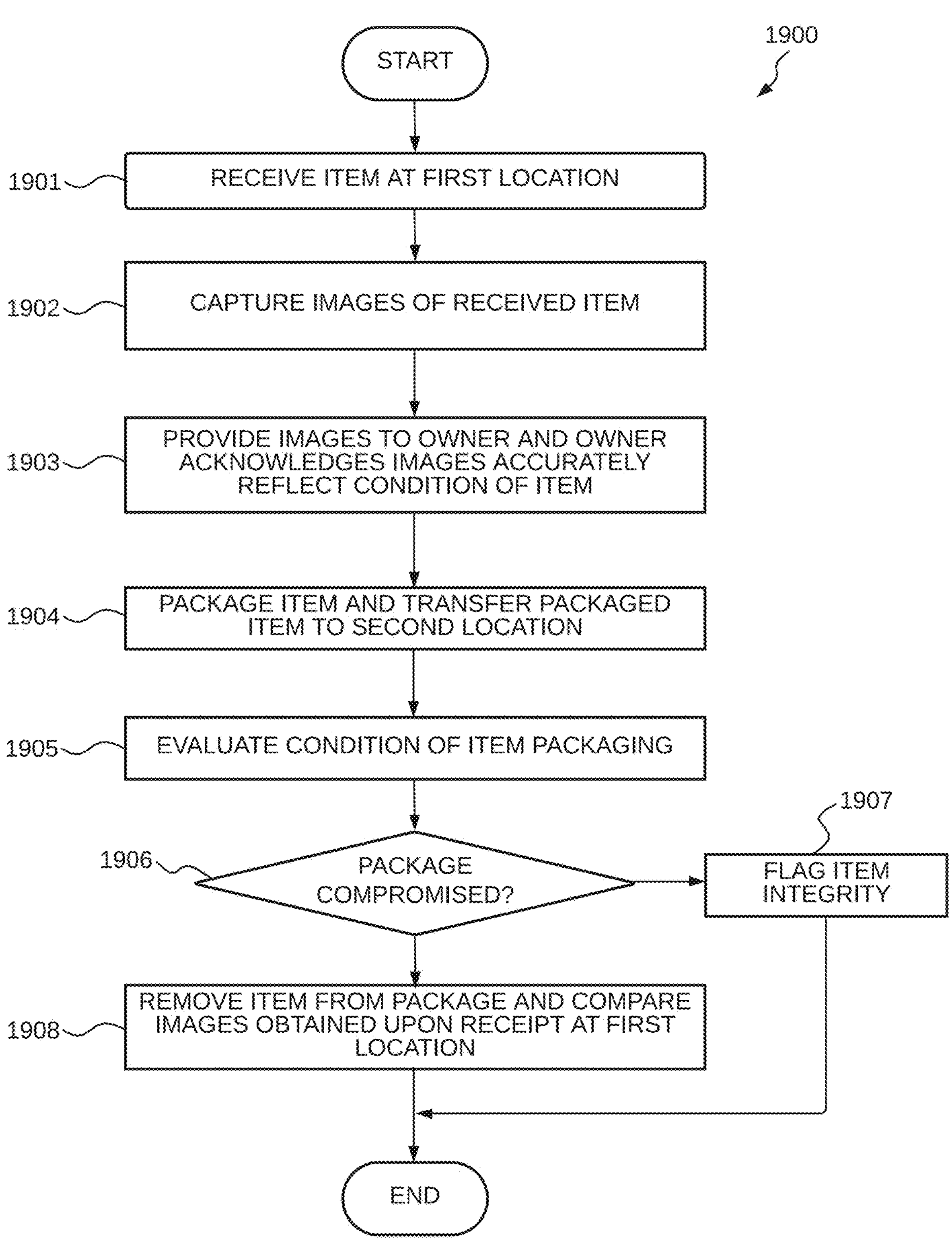
FIG. 19 is a flowchart of a method for confirming the integrity of received items using a guided imaging system.

FIG. 19 is a flowchart of a method 1900 for confirming the integrity of received items using a guided imaging system. Various embodiments of guided imaging systems are described above and in connection with method 400 of FIG. 4.

At block 1901, an item is received at a first location. For example, the item may be a high value, high risk or unique item that is received at the first location.

At block 1902, images of the received item are captured.

At block 1903, the captured images are provided to the item owner to confirm the condition of the item. For example, the item owner can review the images to confirm that the received item is in the same condition as when it was in the owner's possession.

At block 1904, the item is packaged and sent to a second location. For example, the item may be packaged and sent from the first location where it is received to a second location where it is inventoried and stored.

At block 1905, the condition of the item packaging is evaluated at the second location. For example, the packaging is evaluated for dents or damage at the second location.

At block 1906, a determination is made as to whether the package is compromised. If the integrity of the package is compromised, the method proceeds to block 1907. If the integrity of the package is not compromised, the method proceeds to block 1908.

At block 1907, since the package has been compromised, the integrity of the item is flagged to indicate that damage may have been done to the item during transit to the second location.

At block 1908, since the package was not compromised, images of the item are compared to the item received at the second location to confirm that the item is in the same condition as received at the first location.

Thus, method 1900 performs operations for confirming the integrity of items. It should be noted that the operations of method 1900 are exemplary and that the operations can be added to, deleted, rearranged, or otherwise modified within the scope of the embodiments.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A system comprising:
- a plurality of imaging studios in close proximity to each other, wherein each of the plurality of imaging studios comprises a physically bounded space and a dedicated lighting apparatus configured to illuminate the physically bounded space, and wherein the plurality of imaging studios are configured to capture images of a plurality of items, respectively; and
- a camera device executing an application configured to capture at least one image of a selected item in a selected imaging studio, wherein the application is configured to perform operations of:
  - programmatically controlling the dedicated lighting apparatus of the selected imaging studio to set lighting conditions for the selected item;
  - guiding a user to display a selected view of the selected item within the selected imaging studio;
  - capturing an image of the selected item in response to user input; and
  - repeating the operations of controlling, guiding, and capturing until a selected number of views of the selected item have been captured.

2. The system of claim 1, wherein the plurality of imaging studios are adjacent to each other.

3. The system of claim 2, wherein the plurality of imaging studios are horizontally and vertically adjacent to each other.

4. The system of claim 1, wherein the application is further configured to store the selected number of views that have been captured.

5. The system of claim 1, wherein the application is further configured to transmit the selected number of views that have been captured to an external device.

6. The system of claim 1, wherein the application is further configured to perform an operation of:
- detecting lighting conditions within the selected imaging studio.

7. The system of claim 6, wherein the application is further configured to perform an operation of:
- controlling the lighting conditions within the selected imaging studio in response to user input.

8. The system of claim 6, wherein the application is further configured to perform an operation of:
- automatically controlling the lighting conditions within the selected imaging studio based on stored information about the item.

9. The system of claim 1, wherein the application is further configured to perform operations of:
- determining when a captured view of the selected item fails to meet an image quality standard; and
- guiding the user to recapture the captured view that failed the image quality standard.

10. The system of claim 1, wherein one camera device is used to capture images in all imaging studios.

11. The system of claim 1, wherein each imaging studio has an associated camera device.

12. The system of claim 1, wherein each imaging studio has a preconfigured volume between one cubic meter and ten cubic meters.

13. A method for operating a camera device that is part of a plurality of imaging studios in close proximity to each other, wherein each of the plurality of imaging studios comprises a physically bounded space and a dedicated lighting apparatus configured to illuminate the physically bounded space, the method comprising:

identifying an item;

selecting a view of the item within a selected imaging studio;

programmatically adjusting the dedicated lighting apparatus to illuminate the view of the item within the imaging studio;

capturing an image of the view of the item in response to user input; and repeating the operations of selecting, adjusting and capturing until a selected number of views of the item have been captured.

14. The method of claim 13, further comprising:

storing the selected number of views that have been captured.

15. The method of claim 13, further comprising:

transmitting the selected number of views that have been captured to an external device.

16. The method of claim 13, further comprising:

detecting lighting conditions within the selected imaging studio; and controlling the lighting conditions within the selected imaging studio in response to user input.

17. The method of claim 16, wherein the lighting conditions are automatically controlled based on stored information about the item.

18. The method of claim 13, further comprising:

determining when a captured view of the selected item fails to meet an image quality standard; and guiding the user to recapture the captured view that failed the image quality standard.

19. An apparatus comprising:

an image sensor; and means for guiding a user to obtain one or more images of an item in one or more orientations within one of a plurality of imaging studios in close proximity to each other, wherein each of the plurality of imaging studios comprises a physically bounded space and a dedicated lighting apparatus, wherein the item is part of a taxon, wherein the means is also for programmatically controlling the dedicated lighting apparatus within the one of the plurality of imaging studios to set lighting conditions for capturing the one or more images, wherein the means is also for causing the image sensor to capture images of the item in response to user input, and wherein the means is also for notifying the user when sufficient images for the taxon of the item have been obtained.

20. The apparatus of claim 19, wherein the means is a controller.

* * * * *